(12) United States Patent
Pinnavaia et al.

(10) Patent No.: US 6,713,643 B2
(45) Date of Patent: Mar. 30, 2004

(54) ULTRASTABLE ORGANOFUNCTIONAL MICROPOROUS TO MESOPOROUS SILICA COMPOSITIONS

(75) Inventors: Thomas J. Pinnavaia, East Lansing, MI (US); Yutaka Mori, Kitakyusyu (JP)

(73) Assignee: Board of Trustees of Michigan State University, East Lansing, MI (US)

( * ) Notice: Subject to any disclaimer, the term of this patent is extended or adjusted under 35 U.S.C. 154(b) by 370 days.

(21) Appl. No.: 09/865,181

(22) Filed: May 24, 2001

(65) Prior Publication Data

US 2003/0054948 A1 Mar. 20, 2003

(51) Int. Cl.$^7$ .................................................. C07F 7/04
(52) U.S. Cl. ..................... 556/450; 556/453; 556/431; 556/462; 502/158; 502/401; 502/407
(58) Field of Search ................................ 556/450, 453, 556/431, 462; 502/158, 401, 407

(56) References Cited

U.S. PATENT DOCUMENTS

| | | |
|---|---|---|
| 5,672,556 A | 9/1997 | Pinnavaia et al. |
| 5,712,402 A | 1/1998 | Pinnavaia et al. |
| 5,785,946 A | 7/1998 | Pinnavaia et al. |
| 5,800,800 A | 9/1998 | Pinnavaia et al. |
| 5,840,264 A | 11/1998 | Pinnavaia et al. |
| 5,855,864 A | 1/1999 | Pinnavaia et al. |
| 6,162,414 A | 12/2000 | Pinnavaia et al. |
| 6,193,943 B1 | 2/2001 | Pinnavaia et al. |
| 6,248,686 B1 | 6/2001 | Inagaki et al. |
| 6,284,696 B1 | 9/2001 | Koya et al. |

FOREIGN PATENT DOCUMENTS

WO   PCT/WO01/12564   2/2001

OTHER PUBLICATIONS

Liu et al., J. Phys. Chem. 104, 8328 2000.
Lim et al., Chem. Mater. 10 467 (1998).
Fowler et al., Chem. Commun., 201 (1998).
Maquarrie et al., Stud. Surf. Sci, Catal. (2000).
Mercier et al., Chem. Mater. 12 188 (2000).
Hall et al., Chem. Commun., 201 (1999).
Margolese et al., Chem. Mater. 12 2448 (2000).
Van Rhijn et al., Chem. Commun. 317 (1998).
Richer et al., Chem. Commun. 1775 (1998).
Inagaki, J. Amer. Chem. Soc. 121 9611 (1999).
Aseta et al., Nature 402 867 (1999).
Holland et al., 121 4308 (1999).
Feng, S., et al., Science 276, 923 (1997).
Chen, X., et al., Separation Sci. Tech.34 1121 (1999).
Mattigod, S.V., et al., Separation Sci. Tech. 34 2329 (1999).
Mercier, L., et al., Adv. Mater. 9 500 (1997).
Mercier, L., et al., Environ. Sci. Technol. 32 2749 (1998).
Mercier, L., et al., Microporous and Mesoporous Mater. 20 101 (1998).
Brown, J., et al., Chem. Commun. 69 (1999).
Brown, J., et al., Microporous and Mesoporous Mater. 37 41 (2000).
Liu, A.M., et al., Chem. Commun. 1145 (2000).
Bossaert, W.D., et al., J. Catal. 182 156 (1999).

Primary Examiner—Samuel Barts
(74) Attorney, Agent, or Firm—Ian C. McLeod

(57) ABSTRACT

Mesostructured and microporous to mesoporous organofunctionalized silica compositions are described. The compositions incorporate the organofunctional group L as part of a $LSiO_3$ unit in the framework of the compositions. In addition the compositions incorporate the organofunctional group R as part of a $O_3Si$—R—$siO_3$ unit in the framework of the compositions. The compositions are useful as molecular sieves, supports for catalysts and numerous other applications requiring an organo group on surfaces of a silica.

6 Claims, 5 Drawing Sheets

ULTRASTABLE ORGANOFUNCTIONAL MICROPOROUS TO MESOPOROUS SILICA COMPOSITIONS

STATEMENT REGARDING FEDERALLY SPONSORED RESEARCH OR DEVELOPMENT

This invention described in this application was sponsored by NSF grant CHE-9903706. The U.S. Government has certain rights to this invention.

CROSS-REFERENCE TO RELATED APPLICATION

None

BACKGROUND OF THE INVENTION

(1) Field of the Invention

The present invention relates to organofunctionalized microporous to mesoporous silica compositions. In particular, the present invention relates to mesostructured silica compositions in which an open framework structure is formed through a high degree of linking between adjacent $LSiO_3$, $O_3Si$—R—$siO_3$, and $SiO_4$ units, where L and R are organofunctional groups.

(2) Description of Related Art

Organofunctional, mesostructured silica compositions have been recognized as useful materials, particularly molecular as sieves, for use as catalysts for a variety of organic chemical transformations, as trapping agents for metal cation contaminants, as adsorbents for the separation of organic molecules, and as film-forming compositions for electronic applications. These hybrid organic-inorganic compositions can be prepared through two conceptually and practically distinct chemical pathways. The first pathway, denoted the "grafting pathway", is based on the post-synthesis functionalization of a pre-formed pure silica mesostructure. This approach relies on the grafting of organofunctional silanes to the surface silanol groups, denoted ≡SiOH, of the pre-formed mesostructure. Suitable organofunctional silane reagents have at least one hydrolyzable group attached to the organofunctional silicone center.

Theses grafting reagents have the general formula: $L_{4-x}SiY_x$
where L is one or more of the desired organofunctional groups and Y is a hydrolyzable group (typically alkoxide or halide) and x is 1, 2, or 3.

The condensation reaction of a surface silanol groups on the surface of the pre-formed molecular sieve with hydrolyzable groups on the grafting reagent couples the functional organo groups to the surface according to the overall reaction represented below to produce an organofunctional surface.

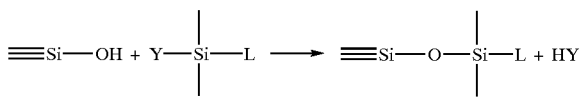

Here ≡Si—OH represents the surface silanol group and

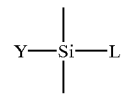

represents the grafting agent.

Depending on the initial silanol group density on the silica surface and the number of hydrolyzable Y groups on the coupling agent, a distribution of one-, two-, or three Si—O—Si covalent linkages are formed between the silica surface and the organofunctional grafting reagent. If only one linkage is formed between the silica surface and the organosilane containing the organofunctional groups, the linkage can be easily broken through hydrolysis reaction upon exposure to water and the organofunctional group is lost. Three linkages to the silica surface avoids loss of the organic functionality through hydrolysis reaction and two bonds would provide intermediate stability. However, even with $LSiY_3$ grafting agents, it is virtually impossible to bind all the organofunctional groups to a silica surface through three Si—O—Si covalent linkages. Such grafting reactions always result in the formation of one, two, as well as three, covalent linkages to the surface of the silica because of spatial mismatches between the surface silonol groups on the surface and the hydrolyzable groups on the coupling reagent. A recent review by Liu et al. (J. Phys. Chem. 104, 8328 (2000)) reveals that the reaction of $LSiX_3$ grafting reagents with mesostructured silica surfaces not only results in fewer than three Si—O—Si linkages to the SiL groups but, in addition, the distribution of the organo groups on the surface is not uniform. Thus, organo-functional molecular sieve silicas formed through coupling reactions with silane grafting reagents are inherently unstable toward hydrolysis and a large portion of the organofunctional groups can be easily dissociated from the surface.

A much more promising approach to forming stable organofunctional mesostructures is to incorporate the organofunctional groups into the molecular sieve framework as it is being assembled from mixtures of organosilicon and silica precursors in the presence of a structure-directing surfactant. In this direct assembly approach the precursor to the organosilicon $LSiO_3$ units is an organosilane reagents of the type $LSiY_3$, where L is the desired organofunctional group and Y is a hydrolyzable group such as an alkoxide or a halogen. The silica precursor to the $SO_4$ units in the framework is typically a $SiY_4$ species containing four hydrolyzable groups. The Si—OH groups formed through the hydrolysis of Si—Y bonds in the precursors have a sterically favorable chance of undergoing condensation-polymerization reaction to form fully crosslinked Si—O—Si linkages in the framework. Thus, in comparison to the grafting pathway, the direct assembly method should result in optimal framework crosslinking for improved stability, as well as in a more uniform distribution of organofunctional groups for improved access in the framework pores.

There have been several attempts to prepare organofunctional molecular sieve silicas by direct assembly methods from $LSiY_3$ and $SiY_4$ precursors using both ionic surfactants, as well as electrically neutral surfactants as the structure directors (Lim et al., Chem. Mater. 10 467 (1998); Fowler et al., Chem. Commun., 201 (1998); Maquarrie et al., Stud. Surf. Sci, Catal. (2000); Mercier et al., Chem. Mater. 12 188 (2000); Hall et al., Chem. Commun., 201 (1999); Margolese et al., Chem. Mater. 12 2448 (2000); Van Rhijn et al., Chem. Commun. 317 (1998); Richer et al., Chem.

Commun. 1775 (1998)). The resulting products all had compositions corresponding to $(SiO_2)_{1-x}(LSiO_{1.5})_x$, when written in surfactant-free, dehydroxylated and anhydrous form. However, x-ray diffraction analysis indicated that the compositions were reliably mesostructured only when x, the fraction of functionalized silicon centers in the framework, was less than about 0.20. At x values greater than 0.20, the long-range mesostructured order was normally lost, as indicated by the absence of an x-ray diffraction peak, thus preventing access to most of the organofunctional groups in the composition. Lim et al. (Chem. Mater. 10, 467 (1998)) represents the only report among many that claims an organofunctional silica mesostructure with an x value somewhat greater than 0.20. In this latter case, the x value was said to be 0.28 when L is a mercaptopropyl group and the structure director is a quaternary ammonium ion surfactant. This is the only organofunctional mesostructure said to have an x value that exceeded the normal limiting value of 0.20 when prepared through direct assembly methods. Even if the claimed value x was accurate, the product was microporous (not mesoporous), and the ionic surfactant was difficult to remove. Thus, there is a need to provide for mesostructured organofunctional $(SiO_2)_{1-x}(LSiO_{1.5})_x$ compositions with x values substantially greater than 0.20, regardless of the nature of the organofunctional group L and a process for producing them.

Another approach to the design of organofunctional mesostructures is based on the surfactant-directed assembly of so-called "bis-silyl" mesostructures with compositions corresponding to $[O_{1.5}Si—R—SiO_{1.5}]$ when written in surfactant-free, dehydroxylated and anhydrous form (Inagaki, J. Amer. Chem. Soc. 121 9611 (1999); Aseta et al., Nature 402 867 (1999); Holland et al., 121 4308 (1999)). Here the R group is an organo group that links two tetrahedrally coordinated silicon centers together through silicon-carbon covalent bonds. These mesostructured compositions are prepared through the hydrolysis of a $Y_3Si$—R—$SiY_3$ precursor, where Y is a hydrolyzable group, in the presence of a suitable surfactant. A typical organic linker group is the ethylene group, $—CH_2CH_2—$. Most but not all of the oxygen atoms on the $O_3Si$—R—$SiO_3$ units comprising the framework bridge adjacent silicon centers to form a framework around the structure-directing surfactant. Hexagonal, cubic, and wormhole framework structures have been reported. Removal of the structure-directing surfactant by solvent extraction produces an open framework structure with atomically disordered (amorphous) $[O_{1.5}Si—R—SiO_{1.5}]$ walls. Although ethylene linker groups have limited chemical functionality, the mesostructures containing such groups have a lower surface polarity in comparison to pure silica mesostructures and this lower surface polarity is expected to be useful in adsorption applications and molecular separations. One severe limitation, however, is the limited ability to incorporate different organofunctional groups into the framework walls. Other linker groups that have been used to form bis-silyl mesostructures have been limited to phenylene, ferrocenylene, thiophenylene, acetylene, and vinyl groups. Thus, there is a need to provide for new organofunctional bis-silyl mesostructures with surface polarities intermediate between conventional bis-silyl mesostructures and conventional silica mesostructures.

Mercapto-functional mesoporous molecular sieve silicas have received considerable attention as heavy metal ion trapping agents (Feng, S., et al., Science 276, 923 (1997); Chen, X., et al., Separation Sci. Tech. 34 1121 (1999); Mattigod, S. V., et al., Separation Sci. Tech. 34 2329 (1999); Mercier, L., et al., Adv. Mater. 9 500 (1997); Mercier, L., et al., Environ. Sci. Technol. 32 2749 (1998); Mercier, L., et al., Microporous and Mesoporous Mater. 20 101 (1998); Brown, J., et al., Chem. Commun. 69 (1999); Brown, J., et al., Microporous and Mesoporous Mater. 37 41 (2000); Lim, M. H., et al., Chem. Mater. 10 467 (1998); Liu, A. M., et al., Chem. Commun. 1145 (2000)). The anchored thiol groups also can be oxidized to provide sulfonic acid functionality for applications in solid acid catalysis (Lim, M. H., et al., Chem. Mater. 10 467 (1998); Van Rhijin, W. M., et al., Chem. Commun. 317 (1998); Bossaert, W. D., et al.,J. Catal. 182 156 (1999); Harmer, M. A., et al., chem. Commun. 1803 (1997); Harmer, M. A., et al., Adv. Mater. 15 1255 (1998); Margolese, D., et al., Chem. Mater. 12 2448 (2000)). The potential usefulness of these derivatives, as well as other organo-functional derivatives, depends critically on the loading of accessible functional groups in the framework. To date, open framework mesostructures have been obtained for compositions in which fewer than 20% of the silicon centers have been functionalized. Therefore, there is a need to devise methods for increasing the loading of mercapto and other functional groups while maintaining the mesoporous framework structure.

Several mercaptopropylsilyl-functionalized mesostructures have been prepared through direct assembly pathways (Lim, M. H., et al., Chem. Mater. 10 467 (1998); Margolese, D., et al., Chem. Mater. 12 2448 (2000); Fowler, C. E., et al., Chem. Commun. 1769 (1997); Hall, S. R., et al., Chem. Commun. 201 (1999), as well as through grafting reactions of preassembled frameworks (Feng, S., et al., Science 276 923 (1997); Mattigod, S. V., et al., Separation Sci. Tech. 34 2329 (1999); Mercier, L., et al., Adv. Mater. 9 500 (1997); Mercier, L., et al., Environ. Sci. Technol. 32 2749 (1998); and Liu, A. M., et al., Chem. Commun. 1145 (2000)) using 3-mercaptopropyltrimethoxysilane (MPTMS) as the funtionalizing agent. In general, as discussed, direct assembly pathways are preferred over grafting methods, in part, because direct assembly pathways afford a more uniform distribution of organo groups on the framework walls. Also, direct assembly allows for better crosslinking of the silane moiety to the silica framework. For instance, 20–30% of the framework silicon centers in hexagonal SBA-15 (Margolese, D., et al., Chem. Mater. 12 2448 (2000) and MCM-41 (Lim, M. H., et al., Chem. Mater. 10 467 (1998)) mesostructures, have been funtionalized with mercaptopropyl groups through the direct assembly of MPTMS and tetraethylorthosilicate (TEOS) mixtures. Also, mercaptopropyl-functionalized silicas with wormhole framework structures, denoted MP-HMS, have been prepared through analogous assembly methods (Brown, J., et al., Chem. Commun. 69 (1999); Macquarrie, D. J., et al., Stud. Surf. Sci. Catal. (2000); Mercier, L., et al., Chem. Mater. 12 188 (2000)).

When assembled from highly polar solvents, organofunctional mesostructures can form sponge-like particles through the intergrowth of mesoscopic wormhole framework domains. Consequently, the framework sites of HMS silicas are generally more accessible for metal ion trapping and chemical catalysis in comparison to their hexagonal SBA-15 and MCM-41 counterparts with the same framework pore size, but with highly monolithic particle morphologies. On the basis of earlier literature reports (Brown, J., et al., Chem. Commun. 69 (1999); Macquarrie, D. J., et al., Stud. Surf. Sci. Catal. (2000); Mercier, L., et al., Chem. Mater. 12 188 (2000)); however, the direct assembly of HMS mesostructures appears to limit the degree to which organo groups functionalize the framework. Little or no mesostructure formation was realized, for instance, at MP loadings above about 20 mole % (Macquarrie, D. J., et al., *Stud. Surf. Sci. Catal.* (2000)).

Relevant patent art on silica compositions includes U.S. Pat. Nos. 5,672,556, 5,712,402, 5,785,946, 5,800,800, 5,840,264, 5,855,864, 6,193,943 and 6,162,414 to Pinnavaia et al. Organofunctionalized silicas are described in PCT WO 01/12564 all owned by a common assignee.

OBJECTS

An object of the present invention is to provide for organofunctional mesostructured compositions in which the fraction of framework silicon atoms that have been organofunctionalized is substantially greater than 0.20, regardless of the nature of the organofunctional group L. This would greatly increase the concentration of accessible organofunctional groups in the solid state and thereby substantially advance the efficacy of organofunctional mesostructures as catalysts, trapping agents, adsorbents, electronic insulators, as well as materials for many other useful applications. These organofunctionalized mesostructured compositions have the formula $(SiO_2)_{1-x}(LSiO_{1.5})_x$ when written in surfactant-free, dehydroxylated and anhydrous form, where x is the fraction of framework silicon centers that have been functionalized by the organo group L.

Another objective of the present invention is to provide for new organofunctional bis-silyl mesostructures with surface polarities intermediate between conventional bis-silyl mesostructures and conventional silica mesostructures. These new organofunctional silica mesostructures have compositions corresponding to $[O_{1.5}Si—R—SiO_{1.5}]_{0.5x}[SiO_2]_{1-x}$ when written in surfactant-free, dehydroxylated and anhydrous form, where x is the fraction of silicon centers that have been funtionalized by the organo group R. Yet another objective is to provide for mesostructured bis-silyl compositions in which any desired organofunctional group L can be incorporated into the framework walls. These latter materials have compositions corresponding to $[O_{1.5}Si—R—SiO_{1.5}]_{0.5(1-x)}[LSiO_{1.5}]_x$ when written in surfactant-free, dehydroxylated, and anhydrous form. In these latter compositions, all of the framework silicon centers are functionalized by organo groups L and R. Since both types of bis-silyl compositions are prepared through direct assembly pathways, the framework walls are highly crosslinked and, therefore, ultrastable in comparison to grafted mesostructures.

SUMMARY OF THE INVENTION

The present invention relates to a microporous to mesoporous organofunctional silica composition wherein a framework for the composition is comprised of $LSiO_3$ and $SiO_4$ units linked through bridging Si—O—Si bonds, wherein L is an organofunctional group bonded to one silicon atom through a silicon-carbon covalent bond, wherein between above 20% to about 70% of the silicon atoms in the framework are $LSiO_3$ units; wherein at least 80% of the silicon atoms in the $LSiO_3$ units are crosslinked through bridging oxygen atoms to three other silicon atoms in the framework; and wherein the composition exhibits at least one x-ray diffraction line corresponding to a lattice spacing between about 1.8 nm and 10 nm.

The present invention also relates to a mesostructured, microporous to mesoporous molecular silica composition wherein a framework for the composition is comprised of $O_3Si—R—SiO_3$ and $SiO_4$ units linked through bridging Si—O—Si bonds; wherein R is an organic group bonded to two silicon atoms through silicon-carbon covalent bonds; wherein the composition exhibits at least one x-ray diffraction line corresponding to a lattice spacing of at least about 2 nm; and wherein the ratio of said units is between 99:1 and 1:99.

Further, the present invention relates to a mesostructured, microporous to mesoporous organofunctional silica composition wherein a framework for the composition is comprised of $O_3Si—R—SiO_3$ and $LSiO_3$ units linked through bridging Si—O—Si bonds, wherein between 1% and 85% of the silicon atoms in the framework are $LSiO_3$ units; wherein L is an organofunctional group linked to one silicon through a silicon-carbon covalent bond and R is an organic group linked to two silicon centers through two silicon-carbon covalent bonds; and wherein the composition exhibits at least one x-ray diffraction line between about 1.8 and 10 nm.

The present invention relates further to a microporous to mesoporous silica composition prepared by calcination at a temperature above 350° C. of a composition comprised of $LSiO_3$ and $SiO_4$ units linked through bridging Si—O—Si bonds, wherein L is an organofunctional group bonded to one silicon atom through a silicon-carbon covalent bond, wherein between above 20% to about 70% of the silicon atoms in the framework are $LSiO_3$ units; wherein at least 80% of the silicon atoms in the $LSiO_3$ units are crosslinked through bridging oxygen atoms to three other silicon atoms in the framework; and wherein the composition exhibits at least one x-ray diffraction line corresponding to a lattice spacing between about 1.8 nm and 10 nm so as to remove the organofunctional groups, wherein imprinted microporous cavities are present in walls of the framework of the silica and the microporous volume is at least 0.05 cc/gm.

The present invention also relates to a microporous to mesoporous silica composition prepared by calcination at temperatures above 350° C. of a composition wherein a framework for the sieve composition is comprised of $O_3Si—R—SiO_3$ and $LSiO_3$ units linked through bridging Si—O—Si bonds, wherein between 1% and 85% of the silicon atoms in the framework are $LSiO_3$ units; wherein L is an organofunctional group linked to one silicon through a silicon-carbon covalent bond and R is an organic group linked to two silicon centers through two silicon-carbon covalent bonds; and wherein the composition exhibits at least one x-ray diffraction line corresponding to a lattice spacing between about 1.8 and 10 nm, so as to remove the organofunctional groups, wherein imprinted microporous cavities are present in the framework of the calcined silica, and the microporous volume is at least about 0.05 cc/gm.

DESCRIPTION OF PREFERRED EMBODIMENTS

Figure 1:
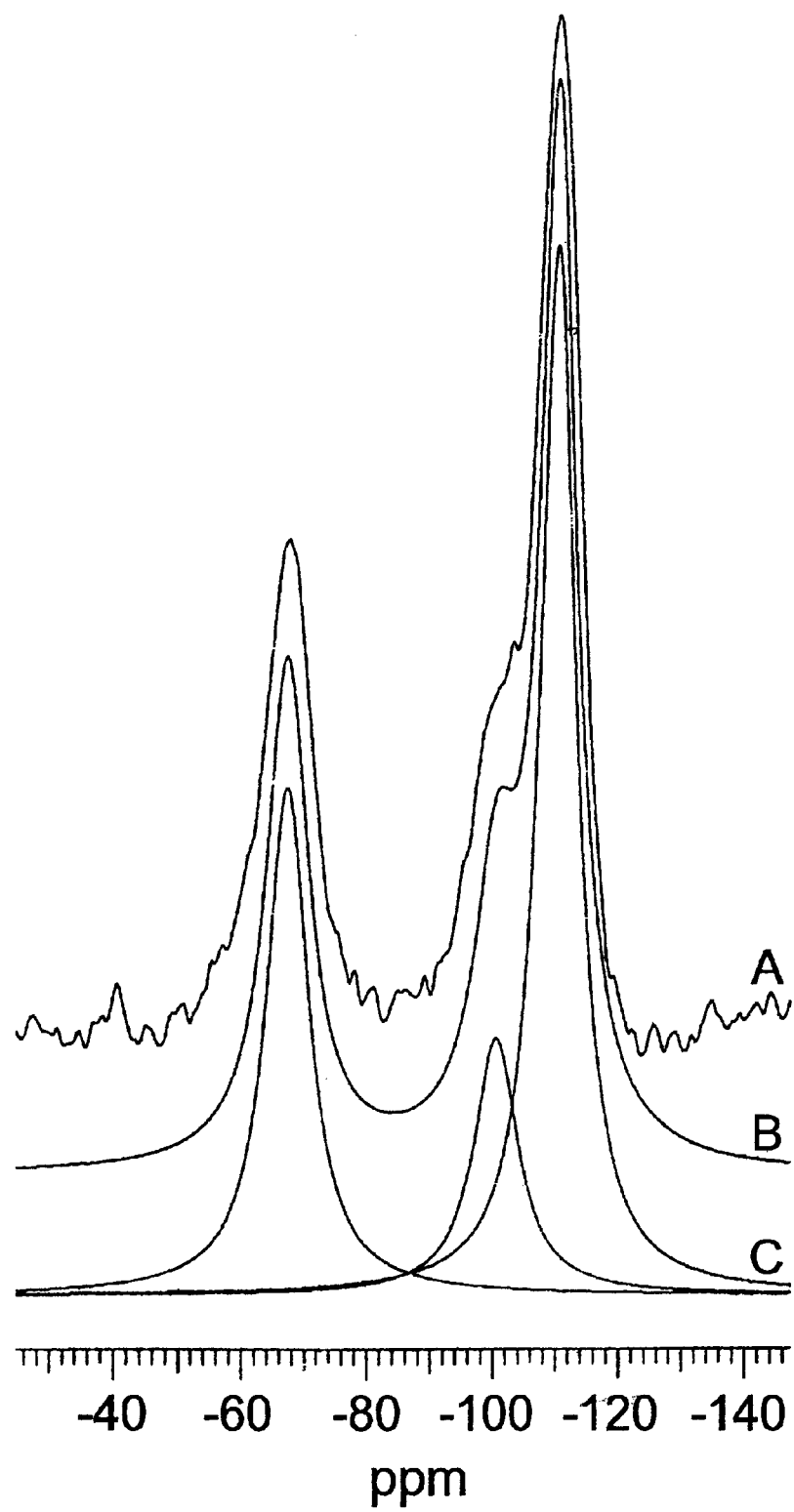
FIG. 1 is a graph showing representative $^{29}Si$ MAS NMR spectra for an organofunctional mesostructure assembled at 65° C. according to Example 1 from octadecylamine at a mercaptopropyl group loading of x=0.30: (A) observed spectrum; (B) simulated spectrum; (C) deconvoluted resonance components of the simulated spectrum.
Figure 2A:
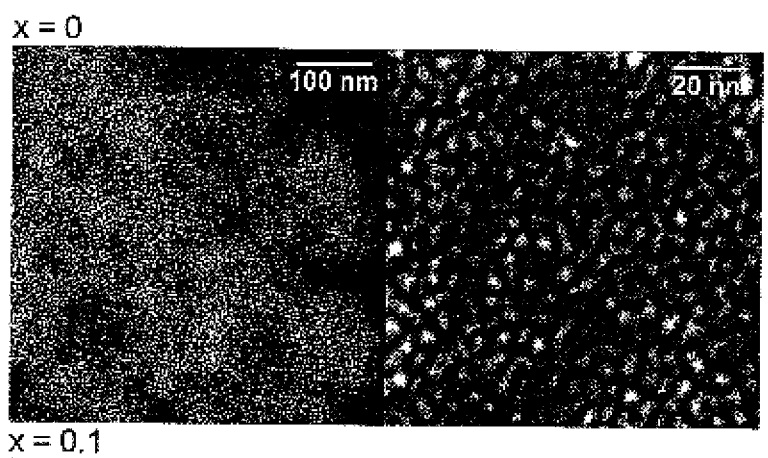
FIGS. 2A to 2D are transmission electron micrographs of representative organofunctional mesostructures assembled at 65° C. from octadecylamine at mercaptopropyl group loadings of x=0–0.40, showing at low magnification on the left, the sponge-like particle texture obtained at x=0–0.20 and the monolithic texture obtained at x=0.40. The high magnification images on the right verify the wormhole framework structure.
Figure 2B:
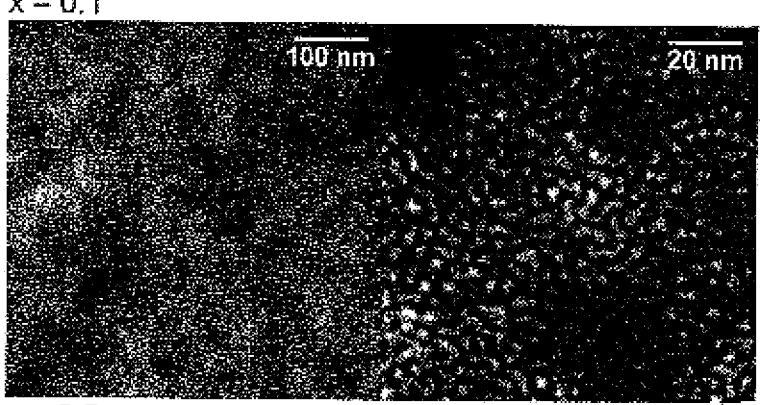
Figure 2C:
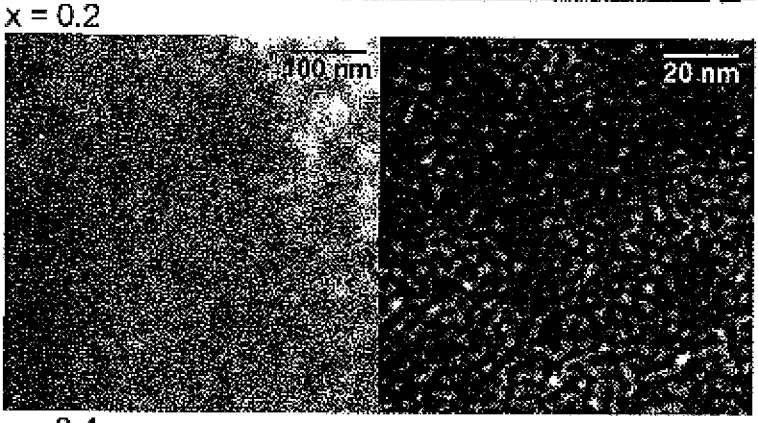
Figure 2D:
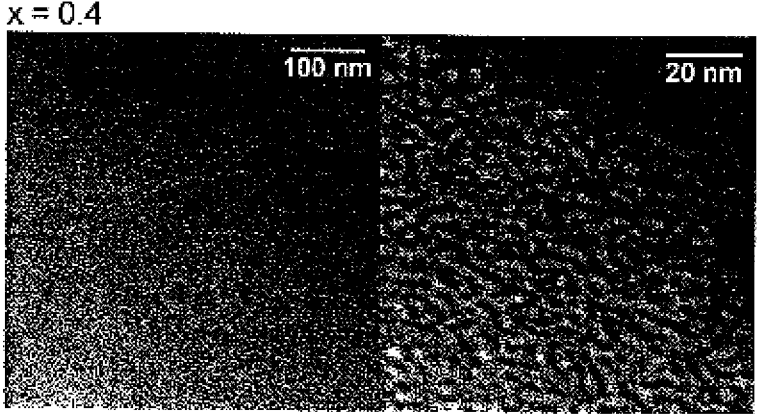

The compositions of the organofunctional molecular sieve silicas represented in the first embodiment of this invention are expressed in dehydroxylated and anhydrous form by the formula $(SiO_2)_{1-x}(LSiO_{1.5})_x$, wherein L is one or more organofunctional groups and x=0.20 to about 0.70. An organofunctional group is defined here as a hydrocarbon moiety comprising carbon-hydrogen covalent bonds and optionally one or more bonds between carbon and heteroatoms selected from the group comprising oxygen, nitrogen, sulfur, phosphorus, boron, fluorine, chlorine, bromine, iodine, antimony, arsenic, tin and lead. The organofunctional groups are linked through covalent silicon-carbon bonds to the walls of the microporous to mesoporous framework structure. In keeping with a mesostructured composition, the framework structure is sufficiently ordered to exhibit at least one x-ray powder diffraction peak corresponding to a lattice spacing greater than about 1.8 nm and provides a relatively uniform framework pore size in the microporous to mesoporous range between about 0.5 to about 10 nm. The framework structures are typically wormhole structures, though hexagonal structures also are possible. In any case the invention is not limited in the framework structure type to any specific symmetry class.

The framework walls of these new compositions are formed through the linking of two types of units, namely, tetrahedral $SiO_4$ units, denoted Q units and tetrahedral $LSiO_3$ units, denoted T units. Thus, a Q unit contains four covalent silicon-oxygen bonds. A T unit contains three covalent silicon-oxygen bonds and one silicon-carbon bond to the organofunctional moiety. The framework is formed by linking the Q and T units through bridging Si—O—Si bonds. Q units in which all four oxygens are bridged to adjacent silicon centers through oxygen bridges are fully crosslinked into the framework structure and are denoted $Q^4$ units. Q units that have three of the four oxygen atoms bridged to adjacent silicon centers and one terminal hydroxyl group are partially crosslinked units, denoted $Q^3$. Also possible are $Q^2$ units with two bridging oxygens and two terminal hydroxyl groups, but these are almost never observed in the present compositions. The T centers may also be fully crosslinked into the framework through the three available bridging oxygen atoms (denoted $T^3$) or partially crosslinked to the framework through two bridging oxygen atoms (denoted $T^2$). The organofunctional group L on the T units does not contribute to framework crosslinking. Approximately, 80% or more of the T units in the compositions described in this invention are fully crosslinked $T^3$ units. The high degree of $T^3$ unit crosslinking into the framework is highly desirable and contributes to the ultra-stability of these organofunctional structures. The said compositions are stable indefinitely to boiling water and to the presence of moisture at temperatures up to 350° C. or more without dissociating the T units from the structure. They are also stable under acidic and basic conditions, which makes them useful for a number of practical applications as described hereinafter.

The organofunctional groups L in the new compositions disclosed here may be electrically neutral as in the cyanoethyl group (—$CH_2$—$CH_2$—CN), positively charged as in the propyltrimethyl ammonium group (—$CH_2$—$CH_2$—$CH_2$—$N(CH_3)_3^+$), or negatively charged as in the phenyl sulfonate group (—$C_6H_4SO_3^-$). The organofunctional groups may be chiral or achiral. The presence of heteroatoms in the organofunctional group is highly desirable because such atoms impart specific chemical activity and physical properties that make possible numerous practical applications of the said new compositions. Examples of specific organofunctional groups comprising oxygen atoms as the heteroatom include, but are not limited to, ketones, aldehydes, carboxylic acids, ethers, alcohols, peroxides, and so forth. Specific organofunctional groups comprising nitrogen as a heteroatom include, but are limited to, amines, azides, nitroxides, nitrites pyrrols, amides, and the like. Once incorporated into the framework structure of an organofunctional porous silica, a given organofunctional group can be transformed into a new organofunctional group through one or more chemical reactions. For instance a mercaptopropyl group, —$CH_2$—$CH_2$—$CH_2$—SH, linked to the framework walls may be transformed into the sulfonic acid moiety —$CH_2$—$CH_2$—$CH_2$—$SO_3H$ by oxidation with peroxide or nitric acid. In addition, the framework-immobilized organofunctional group can be used to bind any of a number of metallic elements, thereby forming immobilized metal complexes that can be used as heterogeneous catalysts or as harvesters of light for photochemical transformations. For instance, an organofunctional molecular sieve silica containing the immobilized triphenylphosphine ligand —$C_6H_4P(Ph)_2$, where Ph represents a phenyl group, can be used to form the anchored Wilkinson olefin hydrogenation catalyst —$C_6H_4(Ph)_2P$—$Rh[P(Ph)_3]_2Cl$ in the pores of the mesostructure.

In addition to the catalytic applications already recited, the ultrastable $(SiO_2)_{1-x}(LSiO_{1.5})_x$ organofunctional silica molecular sieves of this invention can be used for many other applications. The following are identified as additional illustrative examples for the use of these materials, but they are not intended to be limiting with regard to the range of applications:

Organofunctional silica molecular sieve derivatives containing cationic and anionic organofunctional groups impart counter-ion exchange properties, making the said compositions useful as inorganic cation and anion exchangers. By adjusting the polarity of the framework pores though a favorable combination of ionic and electrically neutral organofunctional groups, one can tailor the ion exchange selectivity of the compositions to favor hydrophilic or lipophilic exchange ions.

The said compositions are useful as precursors for the formation of pure silica derivatives with imprinted micropores. Micropores are formed in the walls of the mesopores when an embedded organofunctional group in a $(SiO_2)_{1-x}(LSiO_{1.5})_x$ composition is removed from the composition by calcination at a temperature typically between about 500 and 650° C. Possessing a unique combination of microporosity and mesoporosity, these pure silicas are particularly desirable for selective catalytic and adsorption applications. The imprinted micropores provide desirable substrate selectivity in adsorption and catalysis while the framework mesoporosity provide facile access to the microporous sites. Catalytic centers can be introduced at the microporous sites through attachment of metal centers to the initial organo group prior to calcination or by subsequent impregnation or grafting reactions once the organo group has been removed.

The organofunctional silica molecular sieve compositions can be formed as thin coatings on various substrates. Such thin coatings, less than a few micrometers thick, can be easily formed on semiconducting silicon substrates and used as a low dielectric insulator in the design of electronic devices. The organofunctional groups that are especially useful for forming low dielectric films include, but are not limited to the following groups: an alkyl group with the formula —$C_nH_{2n+1}$, a phenyl group, and organofluorocarbon groups, such as 3,3,3-trifluoropropyl.

Spherical or beaded particle forms of the organofunctional silica molecular sieve compositions with diameters of 1.0 to 100 ìm are ideal for the formation of packed beds and columns suitable for applications in catalysis, adsorption, and chromatographic separations. Spherical particles in this sizes range provide packed beds that allow for the facile and uniform flow of fluids and liquids, thus optimizing catalytic, adsorptive and chromatographic performance.

Optically clear monolithic forms of the organofunctional silica molecular sieve compositions can be fashioned for use in as optical sensors. Obtaining optically clear monoliths with millimeter to centimeter dimensions has been a major challenge in the field of mesostructured materials. Normally, mesostructured materials undergo extensive cracking upon the removal of the structure-directing surfactant. However, the organofunctional silica molecular sieve compositions of this invention are structurally flexible and allow surfactant removal without cracking. Also, the organofunctional group may be removed by high temperature calcination without cracking, allowing for the formation of monolithic forms of pure mesostructured silicas.

The mesostructured $(SiO_2)_{1-x}(LSiO_{1.5})_x$ molecular sieve compositions described in the first embodiment of the present invention were prepared in powdered form by first dissolving a neutral amine structure-directing surfactant in an alcohol solvent at a temperature between ambient and the boiling point of the alcohol. The preferred structure-directing surfactants are primary amines with alkyl chains containing between 10 and 22 carbon atoms, though polyamine surfactants such as the tallow di-, tri-, and tetra amine surfactants supplied by Tomah Industries (Milton, Wis.) and dialkyl mono- and poly-functional amine surfactants can also be used as structure directors. In any case the authors do not want to limit the assembly of these novel compositions to a single family of structure-directing amine surfactants. The preferred alcohol is ethanol, though methanol, propanol and other low cost alcohols were suitable substitutes for ethanol. Water was then added to the surfactant solution and the temperature of the mixture was adjusted to a value between about 40 and 100° C. The key to fully integrating high loadings of organofunctional $LSiO_3$ groups into a mesostructured molecular sieve framework with a high degree of $T^3$ crosslinking is to first utilize an amine surfactant with a large hydrophobic group to obtain the largest possible framework pore sizes for accommodating the organofunctional group. More importantly, however, the assembly process should be carried out under electrically neutral assembly conditions to minimize anionic charge on the framework walls. When the framework walls are charged, terminal $SiO^-$ bonds carry the charge. Such terminal bonds are undesirable because they limit framework crosslinking and compromise stability.

Neutral amine surfactants are well suited to the electrically neutral assembly of mesostructured molecular sieves from $SiY_4$ silica precursors and $LSiY_3$ organosilicon precursors, where Y is a hydrolyzable group. This approach has been used in the prior art cited above. However, the reported mesostructures obtained through this approach have been limited compositions in which not more than 20% of the silicon centers in the framework are organofunctionalized(ie., $x \leq 0.2$). All previously reported products with $x>0.2$ lack a low angle x-ray diffraction peak characteristic of a mesostructured framework. However, the present invention discloses that mesostructured compositions with $x>0.2$ are possible, provided that the assembly temperature is sufficiently high to solubilize the surfactant and the silicon reagents without destroying the mesostructure.

A temperature of 65° C. is generally favorable for most assembly reactions, although the reaction temperature could be as low as ambient temperature 25° C. and as high as 100° C. depending on the surfactant, the organofunctional group L, and the value of x. A (1-x): x molar mixture of a tetraalkoxysilane or a tetrahalosilane ($SiY_4$, where Y is the hydrolyzable alkoxy or halogen group) as a silica precursor and a organofunctional trialkoxy- or trihalosilane ($LSiY_3$), where Y is again the hydrolyzable alkoxy group) was added to the magnetically stirred surfactant solution. Precursors with alkoxy hydrolyzable groups on silicon were preferred over those with halogen groups as reagents, because they eliminate an alcohol instead of an acid upon hydrolysis and this avoids the need to incorporate an equivalent amount of base into the reaction mixture to neutralize the eliminated acid. Methoxy and ethoxy groups were the most preferred hydrolyzable groups on the precursor reagents, more preferably lower alkyl containing 1 to 6 carbon atoms. A favorable, but not limiting, reaction stoichiometry for the preparation of the said compositions in powdered form was a surfactant to total silicon molar ratio of 0.22:1.00 and a alcohol to water ratio of 5:160. The reaction mixture was allowed to age under stirring conditions at the reaction temperature for a period of 24 to 72 hours, with a 72 hour reaction time preferred to ensure complete reaction. The reaction products were filtered and air-dried and then the surfactant was extracted with an alcohol, preferably ethanol, at its boiling point.

Essentially the same assembly procedure described above for the preparation of powdered forms of the $(SiO_2)_{1-x}(LSiO_{1.5})_x$ molecular sieve compositions was used to prepare monolithic forms of the same compositions, except that the reaction mixture is not stirred or shaken, but instead is allowed to age at the desired temperature under static conditions. Under static reaction conditions the reaction mixture segregates initially into two liquid phases with the organic phase containing the surfactant, $SiY_4$, and $LSiY_3$ reagents (Y=alkoxy group) above the aqueous phase and the alcohol partitioned between the two phases. As water diffuses into the organic liquid phase and hydrolyzes the $SiY_4$, and $LSiY_3$ reagents, the organic liquid phase gels and eventually forms a disk-shaped to lens-shaped glassy transparent monolith above the aqueous phase. At a reaction temperature of 65° C. the monolith forms within a reaction period of a few hours. Normally, the monolith is allowed to age in the static reaction mixture for an additional 24 to 72 hours to optimize framework crosslinking. Wetting of the glass reaction vessel by the organic liquid phase plays a role in stabilizing the monolith and preventing cracking. Replacing the glass vessel by a plastic vessel (e.g., polypropylene) led to cracking of the monolith into smaller pieces. Pyrex glass vessels allowed the preparation of monoliths up to several centimeters in diameter and up to a centimeter thick.

The surfactant was then removed from the monolith by solvent extraction in hot alcohol to provide a crack-free, optically transparent, microporous to mesoporous monolith. Owing to their transparency and monolithic form, such monoliths are suitable for use as optical sensors and devices.

The organofunctional $(SiO_2)_{1-x}(LSiO_{1.5})_x$ molecular sieve compositions can also be prepared in solid spherical particle form from biphasic reaction mixtures analogous to that described above for the formation of monoliths. In order to obtain spherical particles, the biphasic reaction mixture is prepared at the desired temperature and immediately shaken for a period of 0.1 to 10 minutes to form spherical particles from 0.1 micrometers to 5 millimeters in diameter. The size of the spherical particles is determined by the intensity and frequency of shaking. For instance, gentle shaking of the biphasic mixture on an orbital shaker at a frequency of 50–200 rpm generates "oil in water droplets" that harden upon framework crosslinking into mesostructured spheres a few millimeters in diameter. Conversely, very vigorous high frequency shaking of the biphasic mixture, as is accomplished when the reaction mixture shaken on a paint mixer, forms an "oil in water emulsion" containing micrometer to sub-micrometer droplets that harden with reaction time and increasing degree of framework crosslinking into mesostructured spheres. Spherical particles in the 1 to 100 micrometer size range are especially desirable for use in adsorption, column chromatography and heterogeneous catalysis, in part, because they allow uniform flow of fluids and gases through a packed bed of the material and because they can be easily dispersed in solvents and recovered by filtration.

The preparation of the organofunctional $(SiO_2)_{1-x}(LSiO_{1.5})_x$ molecular sieve compositions described in the first embodiment of the present invention can also be prepared as continuous, pinhole-free thin films on a variety of substrates, including electronic grade silicon. These films provide a low dielectric barrier useful in the packaging of electronic devises, such as transistors, diodes and the like. The said films were obtained by first preparing a reaction mixture of $SiY_4$, $LSiY_3$, and a structure-directing amine surfactant in an alcohol-rich solvent. As described above for the preparation of powdered forms of the compositions, methanol, ethanol, and isopropanol are preferred the alcohols, Y=methoxide and ethoxide are the preferred hydrolyzable groups on the $SiY_4$ and $LSiY_3$ reagents, and alkyl amines are the preferred amine surfactants. In a typical preparation, the $SiY_4$ and $LSiY_3$ reagents are first mixed as neat liquids in the desired 1-x to x molar ratio, and then combined with a solution of the amine surfactant in the desired alcohol and the desired amount of water. A favorable but not limiting reaction stoichiometry comprises a surfactant to total silicon molar ratio of 0.22:1.00 and a alcohol to water molar ratio of 15.6:5.0. The reaction mixture is allowed to age at room temperature for a preferred aging time of 24 hours before use in forming thin films of the desired $(SiO_2)_{1-x}(LSiO_{1.5})_x$ organofunctional silica molecular sieve compositions. However, aging times as long as 3–6 months and as short as 4 hours provide useful thin films. Thin films on silicon, glass or any other substrate are formed by standard dip coating or, more preferably, spin coating methods under dry atmosphere conditions. The films are optionally heated at 100° C. to facilitate crosslinking of the framework without removing or destroying the structure-directing surfactant. The surfactant can then be removed by heating to a higher temperature to promote surfactant sublimation (e.g., ~350° C. in the case of compositions with L=phenyl or fluorocarbon groups), or by solvent extraction (e.g., hot ethanol).

The organofunctional mesostructured compositions described in the second embodiment of this invention have compositions when written in surfactant-free, dehydroxylated and anhydrous form corresponding to $[O_{1.5}Si—R—SiO_{1.5}]_{0.5(1-x)}[SiO_2]_x$, where R is an organo group that links two tetrahedrally coordinated silicon centers together through silicon-carbon covalent bonds, and x has a value between about 0.01 and 0.99, with values of x between 0.10 and 0.90 being preferred. The mesostructures exhibit an x-ray diffraction peak corresponding to a lattice spacing between about 1.8 and 10 nm. The reactions leading to the formation of these mesostructured compositions are carried out using bis-silyl reagents with the general formula $Y_3Si—R—SiY_3$, where Y is a hydrolyzable group bound to silicon, preferably an alkoxide, as the precursor to the $O_{1.5}Si—R—SiO_{1.5}$ units in the framework. Hydrolyzable $SiY_4$ reagents, where Y is preferably an alkoxide, serve as precursors to the $SiO_4$ units in the framework. Electrically neutral amine surfactants are the preferred structure directors, but the inventors do not want to limit the synthesis of these compositions to any one class of amine surfactant structure directors. The experimental procedures for conducting the assembly reactions are analogous to those described above for the $(SiO_2)_{1-x}(LSiO_{1.5})_x$ mesostructures.

The third embodiment of the present invention provides for mesostructured organofunctional molecular sieves with compositions corresponding to $[O_{1.5}Si—R—SiO_{1.5}]_{0.5(1-x)}[LSiO_{1.5}]_x$, when written in surfactant-free and anhydrous form. The mesostructured compositions with x=0.01 to 0.85 exhibit at least one x-ray diffraction line corresponding to a lattice spacing between about 1.8 and 10 nm. The reactions leading to the formation of these mesostructured compositions are carried out using bis-silyl reagents with the general formula $Y_3Si—R—SiY_3$, where Y is a hydrolyzable group bound to silicon, preferably an alkoxide, as the precursor to the $O_{1.5}Si—R—SiO_{1.5}$ units in the framework. Hydrolyzable $LSiY_3$ reagents, where Y is preferably an alkoxide, serve as precursors to the $LSiO_3$ units in the framework. Electrically neutral amine surfactants are the preferred structure directors, but the inventors do not want to limit the synthesis of these compositions to any one class of amine surfactant structure directors. The applications of these $[O_{1.5}Si—R—SiO_{1.5}]_{0.5(1-x)}[LSiO_{1.5}]_x$ compositions parallel those described above for $[SiO_2]_{1-x}[LSiO_{1.5}]_x$ compositions and can be assembled in powdered, monolithic, spherical particles, or continuous film form. The experimental procedures for conducting the assembly reactions, whether the product is in powdered, monolithic, spherical particle or continuous thin form are analogous to those described above for the $(SiO_2)_{1-x}(LSiO_{1.5})_x$ mesostructures.

Yet a fourth embodiment relates to the use of the above organofunctional mesostructures as precursors to pure silica mesostructures wherein microporosity originating from the organofunctional group is imprinted in the framework walls of the mesostructure. Such imprinted mesostructures are prepared simply by calcining the organofunctional precursor at a temperature sufficient to remove the organo group by combustion.

The organic silanes which are particularly useful are those which will react to form the mesoporous structure. Included are preferred silanes of the formula:

$$LSi(OR)_3$$

where R is a lower alkyl group (1 to 8 carbon atoms) and $R_L$ can be an organic group which can be an alkyl, alkoxy, alkenyl or alkynyl, cycloaliphatic, aromatic group containing 1 to 25 carbon atoms. Especially useful L groups include substituents of O, N or S and can provide a hydroxide, an aldehyde, acid, base, sulfide, cyanide, mercaptan and the like. Examples of basic moieties especially useful as catalysts include amines and pyridyl groups. Useful acidic fuctionalities include carboxylic acids, sulfonic acids, and fluoronated sulfonic acids. L can contain a halogen selected from the group consisting of F, I, Br or Cl and the L group can be further reacted at the halogen group. The preferred L groups contain moieties which are metal binding to provide selective adsorption of metal ions from solution. Especially useful metal trapping agents include organic groups containing chelating ligands such as ethylene diamines, ethylene diamine tri- and tetra acetate, cyclic and bicyclic polyethers known as crown ethers and cryptans and the like.

Examples of commercially available $LS_i(OR)_3$ functional silanes which can be used are:
3-(N-allylamino)propyltrimethoxy-silane;
N-(aminoethyl)-3-aminopropyltrimethoxysilane;
N-[3-(trimethoxysilyl)propyl]ethylenediamine;
N-(6-aminohexyl)aminopropyltrimethoxysilane;
2-[Methoxy(polyethyleneoxy)propyl]trimethoxysilane;
(3-Trimethoxysilylpropyl)diethylenetriamine;
3-Cyanopropyltriethoxysilane;
(3-Cyclopentadienylpropyl)triethoxysilane;
3-Mercaptopropyltrimethoxysilane;
3-Mercaptopropyltriethoxysilane;
3-Methacryloxypropyltrimethoxysilane;
Methyl[2-(3-trimethoxysilylpropylamino)-ethylamino]-3-propionate (65% in methanol);
7-Oct-1-enyltrimethoxysilane;
N-Phenylaminopropyltrimethoxysilane;
Phenyltriethoxysilane;
Phenyltrimethoxysilane;
N-[3-(triethoxysilyl)propyl]-4,5-dihydro-imidazole;
2-(Trimethoxysilyl)ethyl-2-Pyridine;
Trimethoxysilylpropyldiethylenetriamine (95%);
N-[(3-trimethoxysilyl)propyl]ethylene-diamine triacetic acid, trisodium salt (50% in water);
N-(3-trimethoxysilylpropyl)pyrrole;
Vinyltriethoxysilane;
Vinyltrimethoxysilane;
Trimethoxysilylpropyldiethylenetriamine(95%);
N-[(3-trimethoxysilyl)propyl]ethylene-diamine triacetic acid, trisodium salt (50% in water);
Vinyltriethoxysilane;
Vinyltrimethoxysilane.
4-Aminobutyltriethoxysilane (95%);
3-Aminopropyltriethoxysilane;
3-Aminopropyltrimethoxysilane;
N-(triethoxysilylpropyl)urea (50% in methanol).
N-[3-(triethoxysilyl)propyl]phthalamic acid (95%).

The above list is not meant to be limiting, but merely intended to provide examples of easily obtainable functional silanes useful in preparing the compositions of this invention. In general, any functional organosilane may be incorporated into the porous inorganic and organic oxide materials embraced by the present art. Functional organo groups on the silane moiety that are especially useful include acids and bases for catalytic applications, dye chromophores for sensing, and complexants for binding metal ions. In the latter case the bound metal ions may be recovered by ion exchange or subsequently used in the immobilized state as catalysts for organic chemical transformation.

In the examples provided hereinafter are illustrated the main embodiments of the present invention. Table 1 provides a list of abbreviations for reagents and terms used in the descriptions of the examples.

TABLE 1

List of Abbreviations Used in the Examples

| Abbreviations | Definition |
| --- | --- |
| C08 | octylamine |
| C12 | dodecylamine |
| C18 | octadecylamine |
| HK | Horvath-Kawazoe |
| DTF | Differential Function Theory |
| BET | Brunauer-Emmett-Teller |
| $d_{100}$ | lattice spacing |
| x | fraction of silicon sites containing an organofunctional group L |
| L | organofunctional group |
| MAS-NMR | Magic Angle Spinning Nuclear Magnetic Resonance |
| S.A. | Surface area |
| $V_t$ | total pore volume |
| $V_{fr}$ | framework pore volume |
| $V_{tx}$ | textural pore volume |
| TEOS | tetraethylortho silicate |
| TMOS | tetramethylortho silicate |
| MPTMS | mercaptopropyltrimethoxysilane |
| CPTES | 3-cyanopropyltriethoxysilane |
| CETES | 2-cyanoethyltriethoxysilane |
| C1PTMS | 3-chloropropyltrimethoxysilane |
| EtTES | ethyltriethoxysilane |
| PrTMS | propyltrimethoxysilane |
| PhTES | phenyltriethoxysilane |
| FPTMS | 3,3,3-tripfluoropropyltrimethoxysilane |
| TDFTES | tridecaflurooctyltrimethoxysilane |

The physical and chemical properties of the functionalized silicas were obtained using X-ray diffraction (XRD), nitrogen adsorption and $^{29}Si$ and $^{13}C$ MAS NMR. Powder XRD patterns of the materials were recorded on a Rigaku rotaflex diffractometer using Cu—K$\alpha$ radiation. Nitrogen adsorption-desorption isotherms were measured at $-196°$ C. on a Micrometrics ASAP 2010 sorptometer, with the samples outgassed for 12 hours at 120° C. and $10^{-6}$ torr prior to measurement. Surface areas were determined using the BET equation and framework pore sizes using Horvath-Kawazoe or DFT algorithms supplied with the instrument. The framework pore volumes $V_{fr}$ were determined from the volume of nitrogen adsorbed upon filling of the pores at a relative pressure between about 0.4 and 0.8. The total pore volume $V_t$ was obtained at a relative pressure of 0.98, and the textural pore volume $V_{tx}$, which includes intra- and interparticle voids, was obtained from the difference $V_t - V_{fr}$. The proton decoupled $^{29}Si$ and $^{13}C$ MAS NMR spectra were recorded on a Varian VRX 400 MHz spectrometer using 7 mm zirconia rotors with a pulse delay of 400 seconds to ensure full relaxation of the nuclei pror to each scan and a magic angle spinning speed of at least 4 kHz. The chemical shifts for all of the spectra were referenced to TMS (tetramethylsilane). TEM images were obtained on a JEOL 100CX microscope with a CeB$_6$ filament and an accelerating voltage of 120 kV. Samples were prepared by sonicating the powdered samples for 20 minutes in ethanol and then evaporating two drops onto carbon-coated copper grids.

EXAMPLE 1

This example illustrates the assembly of a family of microporous to mesoporous organofunctional molecular sieves compositions wherein the framework is comprised of $LSiO_3$ and $SiO_4$ units linked through bridging Si—O—Si bonds. Here L is an organofunctional group bonded to one silicon atom through a silicon-carbon bond. The compositions correspond to the formula $(SiO_2)_{1-x}(LSiO_{1.5})_x$, when written in surfactant-free, anhydrous, and dehydroxylated form, wherein L is one or more organofunctional groups. In order to indicate the versatility of the direct assembly method for introducing virtually any organofunctional group into the framework structure with optimal crosslinking of the organosilicon centers for maximum stability, a uniform set of reaction conditions, with one exception as described below, was adopted for the assembly of compositions with x values in the range 0.10 to 0.80. The inorganic end member with x=0 was included for comparison.

A 2.2-mmol quantity of the desired alkylamine surfactant was dissolved in 2.3 g of ethanol at 65° C. and 29 ml of water preheated at 65° C. was added. The surfactant mixture was stirred for 30 minutes at 65° C., and then a mixture of TEOS and one or more $LSiY_3$ organoalkoxysilane selected from the list in Table 1 was added dropwise to the vigorously stirred surfactant mixture at 65° C. The total amount of silicon in the reaction mixture was fixed at 10 mmol, and the $LSiY_3$ content was changed to achieve the desired value of x. Thus, the molar composition of each mixture was 0.22 surfactant/1-x TEOS/x organotrialkoxysilane/5 ethanol/ $160H_2O$. After the reaction mixture had been stirred vigorously for about one hour, the sealed reaction vessel was placed in a reciprocating water bath at 65° C. for an additional 72 h. The resulting precipitate was filtered and air-dried for 24 h. The surfactant was extracted from the solid product with boiling ethanol by use of soxhlet apparatus for 24 h. In the case of TMAPTES as a precursor to the $LSiO_3$ units in the framework, the assembly reaction procedure was carried out at 25° C., rather than 65° C.

As shown by the data in Table 2, microporous to mesoporous compositions with x values up to 0.6 were readily realized in this assembly process. Thus, although the degree of mesostructured ordered begins to decrease rapidly above ~60% organo functionalization and results in the broadening and eventual loss of a lattice spacing peak in the XRD, some accessible and useful porosity and surface area is retained even at 70% organofunctionalization for these compositions.

TABLE 2

Physical characteristics of organofunctional molecular sieves prepared by direct assembly.

| Organic Functional Group, L | Amine | x | $d_{100}$ (nm) | Pore Dia. | S.A. ($m^2$/g) | $V_t$ (cc/g) | $V_{fr}$ (cc/g) | $V_{tx}$ (cc/g) |
|---|---|---|---|---|---|---|---|---|
| 3-mercaptopropyl | C08 | 0 | 4.3 | 2.4 | 927 | 0.57 | 0.39 | 0.18 |
| | C08 | 0.1 | 3.7 | 2.0 | 834 | 0.59 | 0.35 | 0.24 |
| | C08 | 0.2 | 3.4 | 1.7 | 703 | 0.56 | 0.35 | 0.21 |
| | C08 | 0.3 | 3.2 | 1.4 | 585 | 0.70 | 0.26 | 0.44 |
| | C08 | 0.4 | 3.0 | | 483 | 0.72 | 0.25 | 0.47 |
| | C08 | 0.5 | 2.6 | | 52 | 0.03 | 0.03 | 0.01 |
| | C12 | 0 | 6.0 | 4.1 | 676 | 0.82 | 0.71 | 0.11 |
| | C12 | 0.1 | 4.0 | 2.9 | 880 | 0.67 | 0.54 | 0.13 |
| | C12 | 0.2 | 4.1 | 2.3 | 1095 | 1.22 | 0.54 | 0.67 |
| | C12 | 0.3 | 4.6 | 2.0 | 1467 | 1.94 | 0.73 | 1.21 |
| | C12 | 0.4 | 4.4 | 1.9 | 1077 | 1.02 | 0.51 | 0.51 |
| | C12 | 0.5 | 4.9 | | 695 | 0.34 | 0.32 | 0.03 |
| | C18 | 0 | 7.9 | 7.5 | 621 | 1.30 | 0.97 | 0.33 |
| | C18 | 0.1 | 5.7 | 4.4 | 813 | 2.14 | 0.85 | 1.29 |
| | C18 | 0.2 | 6.0 | 3.8 | 1157 | 1.47 | 0.99 | 0.48 |
| | C18 | 0.3 | 4.4 | 3.3 | 1191 | 0.97 | 0.87 | 0.10 |
| | C18 | 0.4 | 4.3 | 3.0 | 1319 | 0.89 | 0.84 | 0.05 |
| | C18 | 0.5 | 4.3 | 2.8 | 1225 | 0.71 | 0.69 | 0.02 |
| | C18 | 0.6 | 4.3 | 2.5 | 1133 | 0.73 | 0.68 | 0.06 |
| | C18 | 0.7 | 4.0 | | 443 | 0.38 | 0.34 | 0.04 |
| | C18 | 0.8 | | | 252 | 0.26 | | |
| 1:1 MP:CE mixture | C18 | 0.30 | 4.1 | 2.8 | 1229 | 0.72 | 0.69 | 0.04 |
| 3,3,3-trifluoropropyl | C12 | 0.3 | 3.2 | 1.8 | 1364 | 0.70 | 0.58 | 0.12 |
| | C18 | 0.1 | 5.4 | 4.2 | 774 | 1.90 | 0.83 | 1.07 |
| | C18 | 0.2 | 4.7 | 3.6 | 875 | 0.94 | 0.83 | 0.11 |
| | C18 | 0.3 | 4.1 | 2.8 | 1414 | 0.85 | 0.76 | 0.09 |
| | C18 | 0.4 | 3.8 | 2.5 | 1151 | 0.70 | 0.53 | 0.17 |
| | C18 | 0.5 | 3.5 | 2.0(b) | 486 | 0.30 | 0.22 | 0.08 |
| 2-cyanoethyl | C12 | 0.1 | 4.8 | 3.0 | | | | 0.00 |
| | C12 | 0.2 | 4.3 | 2.8 | 835 | 1.14 | 0.52 | 0.62 |
| | C12 | 0.3 | 3.9 | 2.2 | 1287 | 0.78 | 0.48 | 0.30 |
| | C12 | 0.4 | 3.8 | 1.8 | 757 | 0.33 | 0.31 | 0.02 |
| | C18 | 0.1 | 6.0 | 4.8 | 567 | 1.73 | 0.68 | 1.05 |
| | C18 | 0.2 | 5.6 | 4.0 | 664 | 1.27 | 0.67 | 0.60 |
| | C18 | 0.3 | 5.1 | 3.4 | 482 | 0.54 | 0.37 | 0.17 |
| | C18 | 0.4 | 4.9 | 2.9 | 173 | 0.17 | 0.11 | 0.05 |
| 3-cyanopropyl | C12 | 0.3 | 4.0 | 2.8 | 1110 | 0.60 | 0.58 | 0.02 |
| | C18 | 0.1 | 5.8 | 5.2 | 669 | 1.01 | 0.85 | 0.16 |
| | C18 | 0.3 | 6.0 | 4.8 | 544 | 0.52 | 0.49 | 0.03 |
| 3-chloropropyl | C12 | 0.3 | 3.5 | | 332 | 0.33 | | |
| | C18 | 0.1 | 5.8 | | 541 | 1.02 | 0.45 | 0.57 |
| | C18 | 0.3 | 4.4 | | 350 | 0.37 | 0.32 | 0.05 |
| ethyl | C12 | 0.3 | 4.0 | | 778 | 0.58 | 0.37 | 0.21 |
| | C18 | 0.1 | 6.8 | | 655 | 1.00 | 0.63 | 0.38 |
| | C18 | 0.3 | 5.2 | | 775 | 0.86 | 0.44 | 0.42 |
| n-propyl | C12 | 0.3 | 3.5 | | 1314 | 1.03 | 0.58 | 0.45 |
| | C18 | 0.1 | 5.7 | | 671 | 1.05 | 0.88 | 0.17 |
| | C18 | 0.3 | 4.2 | 2.4 | 1273 | 1.56 | 0.69 | 0.87 |

TABLE 2-continued

Physical characteristics of organofunctional molecular sieves prepared by direct assembly.

| Organic Functional Group, L | Amine | x | $d_{100}$ (nm) | Pore Dia. | S.A. (m$^2$/g) | $V_t$ (cc/g) | $V_{fr}$ (cc/g) | $V_{tx}$ (cc/g) |
|---|---|---|---|---|---|---|---|---|
| n-hexyl | C12 | 0.3 | 3.7 | | 301 | 0.17 | 0.14 | 0.03 |
| | C18 | 0.1 | 5.4 | | 880 | 0.98 | 0.59 | 0.39 |
| | C18 | 0.3 | 3.3 | 1.8 | 586 | 0.57 | 0.31 | 0.26 |
| phenyl | C12 | 0.3 | 3.0 | | 961 | 0.52 | 0.44 | 0.08 |
| | C18 | 0.1 | 5.4 | | 831 | 1.00 | 0.80 | 0.20 |
| | C18 | 0.3 | 3.6 | | 1325 | 0.74 | 0.62 | 0.12 |
| tridecafluorooctyl | C18 | 0.1 | 5.1 | | 587 | 0.45 | 0.39 | 0.06 |
| | C18 | 0.3 | 3.5 | | 961 | | | |
| 3-trimethylammonium propyl | C12 | 0.3 | 4.8 | 4.0 | 693 | 1.57 | 0.58 | 0.99 |
| | C12 | 0.4 | 5.2 | 4.2 | 642 | 1.13 | 0.49 | 0.63 |

It is apparent from the data provided in Table 2 that the lattice spacing and framework pore size increases with increasing hydrophobic chain length on the amine surfactant. Thus the larger the surfactant, the more accessible are the immobilized organofunctional group. It is also important to note that an elevated assembly temperature also is desirable in optimizing framework pore size and organofunctional group access. For instance, a mesostructured composition assembled at 25° C. from dodecylamine with x=0.30 and L is a mercaptopropyl group exhibits a lattice spacing of only 3.3 nm and a framework pore size<1.0 nm, whereas the same composition assembled at 65° C. has a lattice spacing of 4.6 nm and a pore size of 2.0 nm for greatly improved access to the organofunctionalized groups immobilized on the framework walls. Through increases in the assembly temperature up to 100° C. and increases in the surfactant chain length to 22 carbon atoms and beyond, as well as the addition of co-surfactants such as 1,3,5,-trimethylbenzene, one can expect lattice spacings and framework pore sizes of about 10 nm.

Another distinguishing feature of the compositions described in this example is the exceptional degree of framework crosslinking achieved in the assembly process. FIG. 1 provides a typical $^{29}$Si MAS NMR spectrum for a MP-HMS silica assembled from dodecylamine as the surfactant and at an x value of 0.30. The resonances near −100 and −111 ppm represent the $Q^3$ OSi(OSi)$_3$ and $Q^4$ Si(OSi)$_4$ environments of the SiO$_4$ units in the framework, whereas the −59 and −68 ppm signals arise from the $T^2$ and $T^3$ connectivities of the LSiO$_3$ silicon centers. The resonance for the $T^2$ environment of the LSiO$_3$ silicon centers is barely visible as a low field shoulder on the resonance of the $T^3$ peak and corresponds to less than 10% of the LSiO$_3$ silicon centers. Also, the $T^2$ resonance could be eliminated almost completely by post synthesis treatment of the as-made mesostructure at 100° C. for 24–72 h prior to the removal of the surfactant by solvent extraction. In any case, for all the reaction products obtained by this method at least 80% of the LSiO$_3$ silicon centers exhibited $T^3$ linking to the framework walls, regardless of the assembly temperature and the nature of the organotrialkoxysilane reagent.

All of the mesostructured compositions prepared in this example had wormhole framework structures. FIGS. 2A to 2D provide representative TEM images at selected loading of mercaptopropyl groups in the range x=0–0.40. The low magnification images show the sponge-like particle texture obtained at x=0–0.20 and the monolithic particle texture obtained at x=0.40. The high magnification images verify the wormhole framework structure.

EXAMPLE 2

This example illustrates the in-situ conversion of an organofunctional molecular sieve composition $(SiO_2)_{1-x}$ (LSiO$_{1.5}$)$_x$ with x=0.30 and L=mercaptopropyl, wherein the composition is written in surfactant-free, anhydrous, and dehydroxylated form, to a new organofunctional derivative $(SiO_2)1-x(L'SiO_{1.5})_x$ with x=0.30 and L'=propylsulfonic acid.

The initial mesostructure with L=mercaptopropyl and x=0.30 was subjected to solvent extraction by boiling ethanol using a Soxhlet extractor to remove the C18 amine surfactant. The lattice spacing, framework pore volume, BET surface area, and HK pore size, was 4.4 nm, 0.74 cc/g, 1259 m$^2$/g, and 3.3 nm, respectively. The air-dried starting composition (1.0 g) was suspended in two grams of 35% hydrogen peroxide containing three parts methanol as a solvent. The mixture was stirred at room temperature for 24 h. The product was filtered, re-suspended in 100 cc of 0.1M $H_2SO_4$ for 4 h, washed with water and dried under vacuum at ambient temperatures. Oxidation of the thiol group to a sulfonic acid group was verified by $^{13}$C MAS-NMR. The sulfonic acid derivative exhibited resonances at 55, 18, and 11 ppm, as expected for the carbon atoms in the propyl group linked to a sulfonic acid group. No resonance lines indicative of a methylene group linked to a thiol group (27 ppm) or to a disulfide group (41 and 23 ppm) were observed. The lattice spacing, framework pore volume, BET surface area, and HK pore size for the reaction product were 4.4 nm, 0.68 cc/g, 1154 m$^2$/g, and 3.3 nm, respectively, indicating retention of the mesostructure upon peroxide oxidation of the thiol group to a sulfonic acid group. Analogous results were obtained for the oxidation of a thiol-functionalized mesostructure with x=0.50.

EXAMPLE 3

This example illustrates that the compositions describe in Example 1 can be obtained in continuous thin film form through spin casting methods on an electronic grade silicon wafer six inches in diameter.

A mixture of TMOS and FPTMS in the desired molar ratio was added to a solution of C12 amine in the minimum amount of absolute ethanol. Water in the dodecylamine was removed prior to use by azeotropic distillation under vacuum so that the amount of water present in the reaction mixture was controlled explicitly by the amount deliberately added to the mixture. A water-ethanol mixture was added to the TMOS-FPTMS-C12 amine mixture, bringing the final composition of the solution to:

0.22 dodecylamine/1-x TMOS/x FPTMS/15.6 ethanol/5.0 water, where x=0.3 to 0.7, but with x=0.5–0.6 preferred. A clear reaction mixture was maintained at room temperature even after aging for several months in a sealed container. A six-inch diameter electronic grade silicon wafer was set up on a spin-coating apparatus. The precursor solution was spread onto the substrate surface and the substrate was immediately spun at 1300 rpm for 30 seconds under a dry atmosphere. Removal of the excess solution and the evaporation of solvent occurred quickly, resulting in uniformly thin film of the organofunctional mesostructure on the substrate. Increasing or decreasing the spinning rate resulted in thinner or thicker films, respectively. Varying the amount of solvent is another effective way of controlling film thickness. Films with a thickness between 0.1 and 1.0 micrometer were obtained in this way. Thicker films could be achieved through the deposition of multiple spin coatings. The coating were crosslinked by heating in an over at 100° C. for several hours. Surfactant was removed either by evaporation at 350° C. or by solvent extraction with ethanol. Interferometry indicated the refractive index of the films to be in the range 1.1 to 1.5, meaning they have a low dielectric constant suitable for use in electronic packaging.

EXAMPLE 4

This example illustrates that the compositions of Example 1 can be obtained as optically transparent monoliths several centimeters in size to spherical particles in the sub micron to several hundred micrometer range. Due to their optical clarity the monoliths are promising materials for the design of optical sensors based on selective adsorption or catalysis. Spherical particles up to several hundred micrometers in diameter are desirable for use in chromatographic applications and fluidized bed catalysis.

The preparation of disk-shaped to lens-shaped monolithic mesostructures with compositions corresponding to those described in Example 1 were typically obtained as follows. First, 2.2 mmol of alkylamine surfactant was dissolved in 2.3 g of ethanol at 65° C. in a glass vial. A 10-mmol mixture of TEOS and the desired organoalkoxysilane then was added to the surfactant solution to obtain a clear mixture at 65° C. Preheated water (65° C.) then was added to obtain a reaction mixture with the molar composition 0.22 surfactant/1-x TEOS/x organoalkoxysilane/5 ethanol/160H$_2$O, where x=0.1 to 0.7. The reaction mixture separated immediately into two phases, organic phase over water phase. The mixture was aged statically at 65° C. for 72 h. As the reaction time increased over the 72-hour period, the organic phase became solidified and eventually a disk-shaped to lens-shaped monolithic organofunctionalized mesostructure was formed in the shape of the organic phase. A relatively narrow glass vial up to one or two centimeters in diameter was preferred. The solid, transparent monolith was carefully detached from the glass walls of the reaction vessel and the surfactant was removed from the as-made mesostructure by extraction with hot ethanol with retention of optical clarity.

The replacement of the glass vial by a polypropylene vial failed to support the developing monolith and irregular transparent pieces of mesostructure several millimeters in size were deposited at the bottom of the vial. Regardless of the composition of the reaction vial, however, spherical particles of the mesostructure were formed when the vial was shaken for 10 to 60 seconds immediately after water was added to the organic phase to form the two phase reaction mixture to form an emulsion of spherical particles. Allowing the emulsion to age statically at 65° C. for 72 hours afforded a crosslinked mesostructure with the same particle morphology as the initial emulsion. The frequency and intensity of shaking determines the diameters of the spherical particles. The more vigorous the mixture is shaken, the smaller is the final sphere size.

EXAMPLE 5

This example illustrates the synthesis of organofunctional mesostructures wherein the framework is comprised of $O_3Si$—R—$SiO_3$ and $SiO_4$ units linked through bridging Si—O—Si bonds and R is an organic group bonded to two silicon atoms through silicon-carbon covalent bonds. In this example the R group is an ethylene group.

A series of mesostructured compositions was assembled at 25° C. from BTESE and TEOS in the presence of dodecylamine as the structure director and a reaction stoichiometry of 0.22 dodecylamine/1-x TEOS/0.5× BTESE/5.0 ethanol/160 water, where x=0, 0.2, 0.4, 0.6, 0.8 and 1.0. Here the value of x identifies the fraction of silicon atoms in the framework that have been organofunctionalized. After a reaction time of 48 h the surfactant was removed from the as-made mesostructure by extraction with boiling ethanol. Table 3 provides the structural properties of the organofunctionalized mesostructures.

TABLE 3

Properties of mesostructures prepared according to Example 5

| x | Lattice Spacing (nm) | Pore volume (cc/g) | | | | Pore Size (nm) | BET S.A. (m$^2$/g) |
|---|---|---|---|---|---|---|---|
| | | $V_f$ | $V_t$ | $V_{tx}$ | $V_{tx}/V_f$ | | |
| 0 | 4.4 | 0.80 | 1.20 | 0.40 | 0.50 | 3.1 | 973 |
| 0.20 | 4.1 | 0.66 | 1.05 | 0.39 | 0.59 | 2.6 | 1188 |
| 0.40 | 4.3 | 0.68 | 1.06 | 0.38 | 0.56 | 2.6 | 1288 |
| 0.60 | 4.5 | 0.74 | 1.24 | 0.49 | 0.67 | 2.6 | 1401 |
| 0.80 | 4.6 | 0.68 | 1.28 | 0.60 | 0.89 | 2.5 | 1402 |
| 1.00 | 5.3 | 0.66 | 1.31 | 0.65 | 0.99 | 2.1 | 1396 |

EXAMPLE 6

This example provides representative organofunctional mesostructures in which the framework walls are comprised of $O_3Si$—R—$SiO_3$ and $LSiO_3$ units linked through bridging Si—O—Si bonds. BTESE and CETES were selected as the $Y_3Si$—R—$SiY_3$ and $LSiY_3$ reagents, respectively, where Y is a hydrolyzable ethoxy group. The desired ratio of BTESE and CETES were mixed and added dropwise to a vigorously stirred mixture of dodecylamine in ethanol-water at 25° C. After one hour of stirring the sealed glass reaction vessel was transferred to a reciprocating water bath at 25° C. for 48 hours. The molar composition of the reaction mixture was 0.22 dodecylamine/0.5(1-x) BTESE/x CETES/5.0 ethanol/160H$_2$O. Dodecylamine in the as-made sample was then extracted with ethanol at 65° C. As shown by the data in Table 4, mesostructured and mesoporous organofunctionalized compositions were obtained at x values between 0.10 and 0.50.

TABLE 4

Properties of the mesostructures assembled as described in Example 6

| x | Lattice Spacing (nm) | Pore volume (cc/g) | | | | Pore size (nm) | BET S.A. (m$^2$/g) |
|---|---|---|---|---|---|---|---|
| | | $V_f$ | $V_t$ | $V_{tx}$ | $V_{tx}/V_f$ | | |
| 0 | 5.3 | 0.66 | 1.31 | 0.65 | 0.99 | 2.1 | 1396 |
| 0.10 | 5.7 | 0.74 | 1.26 | 0.52 | 0.70 | 2.6 | 1238 |
| 0.20 | 5.8 | 0.64 | 0.93 | 0.29 | 0.45 | 2.6 | 1175 |
| 0.30 | 5.2 | 0.54 | 0.71 | 0.17 | 0.31 | 2.5 | 1098 |
| 0.40 | 5.0 | 0.51 | 0.60 | 0.09 | 0.18 | 2.5 | 1072 |
| 0.50 | 4.9 | 0.47 | 0.50 | 0.03 | 0.06 | 2.4 | 1040 |

Mesostructured products also were obtained even at x values of about 0.85, though the diffraction lines became more broadened at these high levels of $LSiO_3$ units incorporation into the framework. Nevertheless, useful microporosity was still realized at these higher levels of organofunctionalization.

EXAMPLE 7

This example demonstrates the use of the compositions of Example 1 as precursors to silica mesostructures in which the walls are imprinted by micropores. The imprinted micropores are formed by removing the embedded organofunctional groups L from the compositions through thermal decomposition at temperatures above about 600° C. Mesoporous compositions containing cyanoethyl (CE), mercaptopropyl (MP), and trifluoropropyl (FP) groups and an x value of between 0.3 and 0.5 were calcined at 600° C. to remove the organofunctional groups. Nitrogen adsorption isotherms indicated that the mesoporous framework structure and pore size was retained upon the removal of the organo groups. In addition, a microporous pore volume of at least 0.05 cc per gram was present for the calcined samples that was not present for the organofunctional mesostructures, establishing that the organofunctional groups were indeed embedded in the framework walls. The micropore volume was determined from t-plots of the nitrogen adsorption data (S. J. Gregg and K. S. W. Sing, Adsorption, Surface Area and Porosity", $2^{nd}$ Edition, Academic Press, London, pp. 94–100 (1982)).

EXAMPLE 8

This Example duplicates some of the data in Example 1 for comparative purposes. A series of mercaptopropyl-functionalized wormhole mesostructures, denoted MP-HMS, were prepared through the S°I° assembly of alkylamine surfactants (SO) and mixtures of 3-mercaptopropyltrimethoxysilane and tetraethylorthosilicate as framework precursors (I°). Unprecedented levels of organofunctionalization, corresponding to at least 50% of the silicon sites, were achieved while retaining well-expressed mesostructures with pore sizes; pore volumes, and surface areas as high as 2.8 nm, 0.69 cm$^3$/g and 1225 m$^2$/g, respectively. Also, up to ~90% of the framework silicon sites could be fully cross-linked, lending exceptional hydrothermal stability to the mesostructures. The funtionalized MP-HMS derivatives were produced through the use of long-chain alkylamine surfactants as structure directors (e.g., octadecylamine) in combination with a relatively high assembly temperature (e.g. 65° C.) and a high polarity water-ethanol solvent. Increasing the assembly temperature increased both the framework pore size and the degree of framework crosslinking, whereas increasing the MP content lowered the pore size while improving the framework crosslinking. The effects of assembly temperature and MP loading were attributable to changes in hydration at the H-bonded S°I° interface and concomitant changes in the surfactant packing parameter.

In the present Example 8 the factors that mediate the framework pore sizes and pore volumes of organofunctional molecular sieve silicas prepared through a direct assembly pathway have been elucidated. The results show that highly accessible mesoporous wormhole framework structures can be assembled at MP loadings of at least 50%, and even up to ~60 mole % through favorable choices of the structure-directing surfactant and assembly conditions. These results hold important implications for use of these MP-HMS derivatives as metal ion trapping agents and as supported sulfonic acid reagents.

Experimental.

Tetraethylorthosilicate (TEOS), 3-mercaptopropyltrimethoxysilane (MPTMS) and all alkyl amine surfactants were purchased from Aldrich Chemical Co. These reagents were used as-received without further purification. Deionized water and absolute ethanol were used in the synthesis and surfactant extraction processes, respectively.

The synthesis of mercapto-functionalized HMS silicas was carried out by first dissolving 2.2 mmol of the desired alkylamine surfactant in 2.3 g ethanol at 65° C. and then diluting the surfactant solution with 29 mL of water pre-heated at 65° C. The surfactant solution was then shaken in a reciprocating water bath at the desired assembly temperature for a period of 30 minutes. A 10-mmol quantity of a x MPTS and (1-x) TEOS mixture where x equals the molar fraction of total silicon present as mercaptopropyl silane, was then added with vigorous stirring to the surfactant solution. The reaction vessel was sealed, and the mixture was allowed to age with stirring for 72 h. The resulting product was filtered and air-dried for 24 h. Surfactant removal from the as-made mesostructure was accomplished by Soxhlet extraction for a period of 24 h using ethanol as the solvent. The ethanol-extracted product was then allowed to dry in air before use.

Results

Mesostructure Assembly.

Mercaptopropyl-functionalized silica mesostructures were prepared through a S°I° supramolecular assembly pathway. Dodecyl-, tetradecyl-, hexadecyl- and octadecylamine served as representative alkylamine surfactants (S°) for the assembly of 3-mercaptopropyl-trimethoxysilane (MPTMS) and tetraethylorthosilicate (TEOS) as framework precursors (I°). The assembly process was investigated over the stoichiometric range 0.10–0.30 alkylamine:x MPTS:(1-x) TEOS, where x=0.10–1.00 represents the fraction of silicon centers that are MP-functionalized.

A survey of the reaction products formed at x=0.30, S°/I° ratios in the range 0.10–0.30 and solvent compositions in the range 100:0 to 20:80 (v/v) H$_2$O: ethanol indicated that mercaptofunctional mesostructures with well-expressed wormhole framework structures and textural porosity were favored at S°/I°=0.20–0.25 and a solvent composition of 90:10 (v/v) H$_2$O: ethanol. Similar surfactant:reagent ratios and solvent compositions have been reported as being preferred for the assembly of purely inorganic silicas (Tanev, P. T., et al., *Science* 267 865 (1995); Tanev, P. T., et al., *Chem. Mater.* 8 2068 (1996); and Zhang, W., et al., *chem. Mater.* 9 2491 (1997)). Although wormhole mesostructure formation was found to occur only for x≦0.60 (see below), chemical analysis and $^{29}$Si NMR indicated that essentially all of the organosilicon was incorporated into the reaction products whether they were mesostructured or not. For the product prepared at a reaction stoichiometry of x 0.50, the yield was >95%. Also, the relative intensities of the $^{29}$Si NMR resonances for the MP-SiO$_3$ and SiO$_4$ framework sites were equal within experimental uncertainty, and elemental analyses confirmed the NMR result. Thus, the assembly reaction was very nearly quantitative.

Effect of Assembly Temperature and MPTMS Loading.

In order to determine the effect of assembly temperature on the framework porosity and textural properties of MP-functionalized mesostructured silicas, assembly reactions were carried out at 25–65° C. Dodecylamine was used as the surfactant, and the fraction of total silicon centers present as mercaptopropyl-functionalized centers was maintained at x values of 0.10, 0.20, and 0.30. Each surfactant-free product exhibited a single low angle XRD peak characteristic of a wormhole framework with a pore—pore correlation distance of 3.6–4.6 nm. The structural properties of these products are given in Table 5.

TABLE 5

Effect of Assembly Temperatures on the Structural Properties of MP-Functionalized Mesostructures Assembled from x MPTMS and (1 − x) TEOS Mixtures [a]

| x | Temp. (° C.) | $d_{001}$ (nm) | Pore Dia [b] (nm) | S.A.[c] (m$^2$/g) | $V_t^d$ (cm$^3$/g) | $V_{fr}^e$ (cm$^3$/g) | $V_{tx}^f$ (cm$^3$/g) |
|---|---|---|---|---|---|---|---|
| 0.1 | 25 | 3.6 | 2.2 | 1346 | 1.39 | 0.62 | 0.77 |
| 0.1 | 45 | 4.6 | 2.7 | 1162 | 0.85 | 0.59 | 0.26 |
| 0.1 | 65 | 4 | 2.9 | 880 | 0.67 | 0.54 | 0.13 |
| 0.2 | 25 | 3.4 | 1.8 | 1198 | 0.77 | 0.55 | 0.22 |
| 0.2 | 45 | 4.1 | 2.2 | 1484 | 1.27 | 0.68 | 0.59 |
| 0.2 | 65 | 4.1 | 2.3 | 1095 | 1.22 | 0.54 | 0.68 |
| 0.3 | 25 | 3.3 | <1.0 | 928 | 0.52 | 0.44 | 0.08 |
| 0.3 | 45 | 3.7 | 2.1 | 1286 | 1.03 | 0.62 | 0.41 |
| 0.3 | 65 | 4.6 | 2 | 1467 | 1.94 | 0.73 | 1.21 |

[a] In each case dodecylamine was the structure director.
[b] Determined by the Horvath-Kawazoe model.
[c] Calculated by the Brunauer-Emmett-Teller (BET) method.
[d] Total pore volume determined at P/P ° = 0.98.
[e] Framework pore volume determined at P/P ° = 0.55.
[f] Textural pore volume determined from the difference between $V_t$ and $V_{fr}$.

At low MP loadings (x=0.10), the framework pore sizes increased with increasing assembly temperature, although the surface area and total pore volume decreased. The benefits of a higher assembly temperature become more evident, however, at higher levels of MP-functionalization where the framework pore size inevitably tended to decrease due to the presence of more MP groups in the framework. Even at an intermediate MP loading of x=0.30, the surface area, pore volume and framework pore size all increased upon increasing the assembly temperature from 25 to 65° C. Efforts to further enlarge the pore size by increasing the assembly temperature beyond 65° C., however, were unsuccessful. At assembly temperatures between about 75–100° C., mesostructure assembly at x=0.30 was compromised, as indicated by a loss of both the framework pore volume and the low angle XRD peak. Therefore, the assembly of all subsequent MP-HMS mesostructures was carried out at 65° C.

Figure 3:
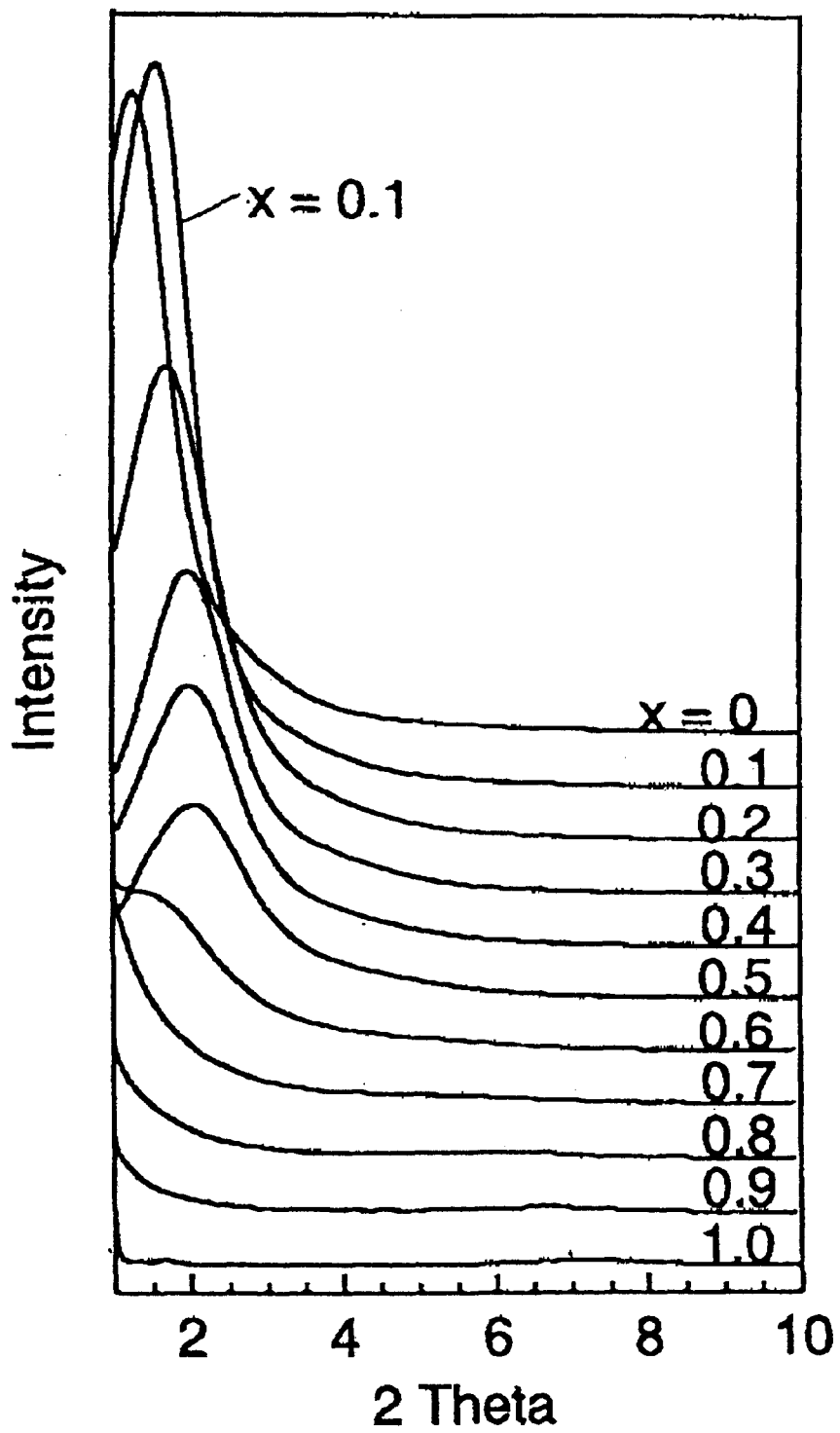
FIG. 3 is a graph showing XRD patterns (Cu—$K_a$) for the products formed at 65° C. from octadecyldecylamine and x MPTMS: (1-x) TEOS reaction mixtures.

Regardless of the temperature for the assembly process, however, no wormhole mesostructure could be observed for products formed at MPTMS:TEOS stoichiometries corresponding to x>0.60. As shown by the powder diffraction patterns in FIG. 3 for the products assembled at 65° C. using octadecylamine as the structure director, the pore to pore correlation peaks were absent for the compositions formed at x values above ~0.70, whereas below this value each product was clearly mesostructured.

Effect of Surfactant Chain Length on Porosity.

Figure 4:
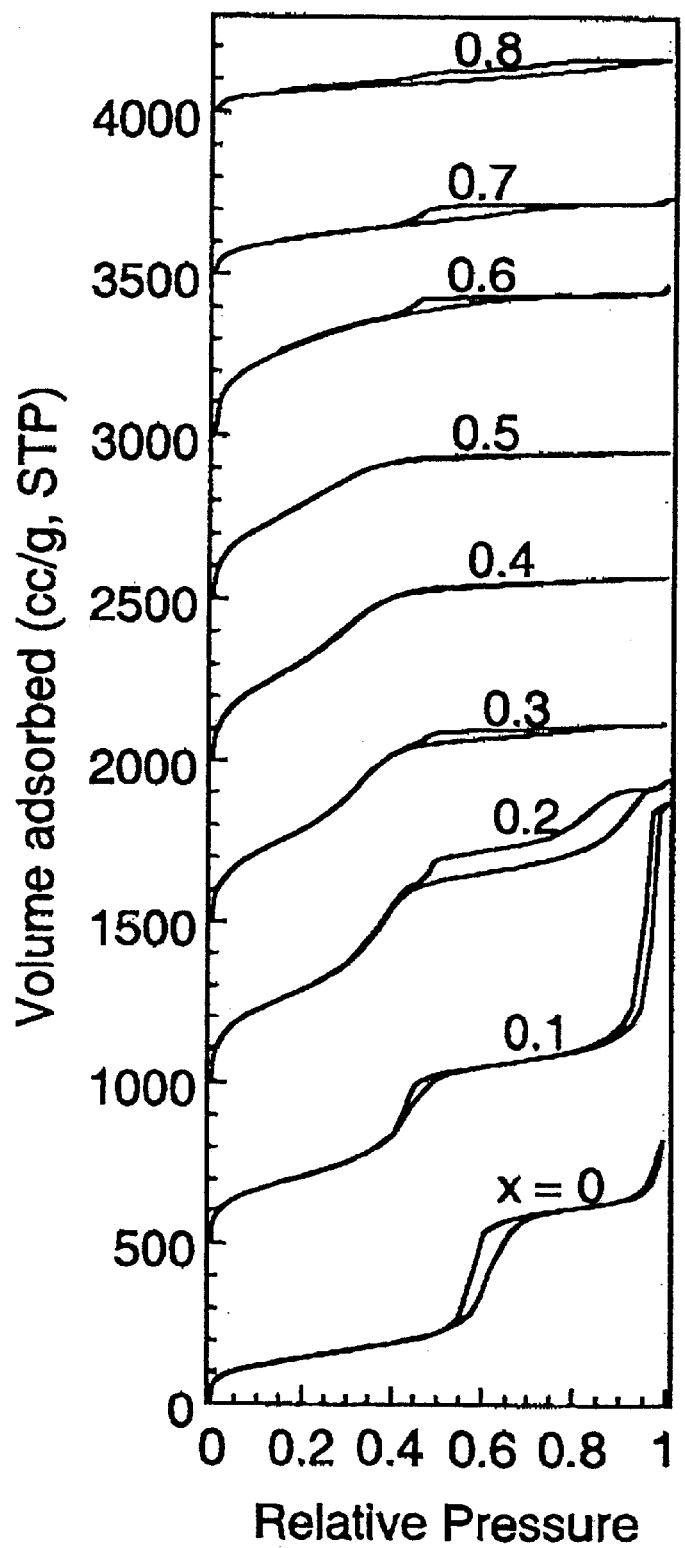
FIG. 4 is a graph showing $N_2$ adsorption-desorption isotherms for mercaptopropyl-functionalized silicas formed at 65° C. from x MPTMS and (1-x) TEOS mixtures in the presence of octadecylamine as surfactant. Only the compositions with MP loadings x<0.70 are MP-functionalized mesostructures.
Figure 5:
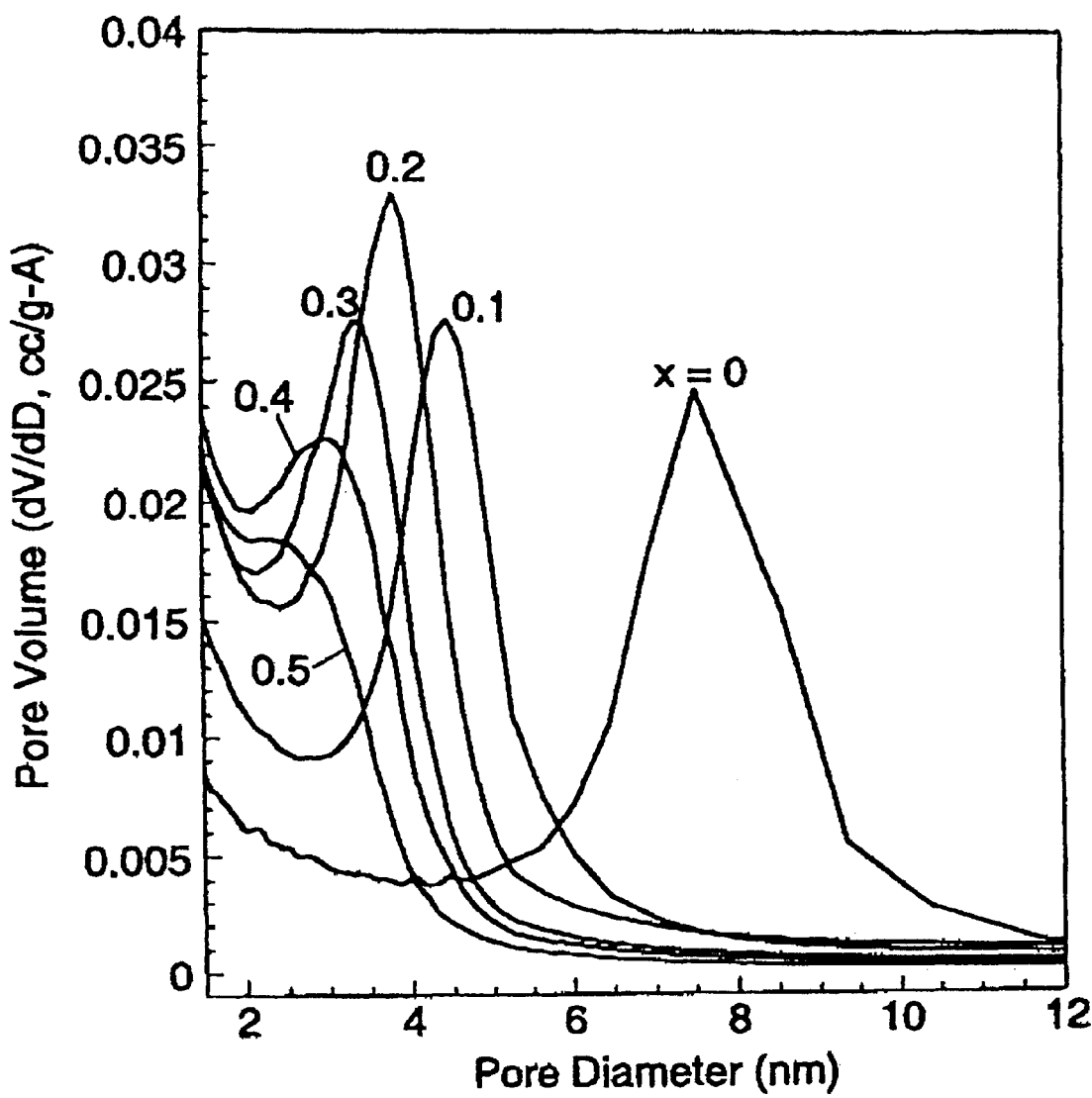
FIG. 5 is a graph sowing Horvath-Kawazoe pore size distributions obtained from the nitrogen adsorption isotherms of the MP-functionalized mesostructures described in FIG. 4.

FIG. 4 provides the N$_2$ isotherms for the mesostructured MP-HMS compositions assembled from octadecylamine at x=0.0–0.60. Included for comparison are the isotherms for the non-structured products obtained at x=0.70 and 0.80. The Horvath-Kawazoe framework pore size distributions for the mesostructures are given in FIG. 5. The textural properties of the mesostructures, along with those assembled from shorter chain amines are summarized in Table 6.

TABLE 6

Dependence of MP-Functionalized Mesostructure Properties on Surfactant Chain Length and MP Loading (X)[a]

| Amine Surfactant | x | $d_{001}$ (nm) | S.A.[c] (m$^2$/g) | Pore Dia.[b] (nm) | $V_t^d$ (cm$^3$/g) | $V_{fr}^e$ (cm$^3$/g) | $V_{tx}^f$ (cm$^3$/g) |
|---|---|---|---|---|---|---|---|
| dodecylamine | 0.10 | 4.0 | 880 | 2.9 | 0.67 | 0.54 | 0.13 |
| tetradecylamine | 0.10 | 5.3 | 800 | 3.6 | 1.12 | 0.73 | 0.39 |
| hexadecylamine | 0.10 | 5.5 | 854 | 3.8 | 1.45 | 0.82 | 0.63 |
| octadecylamine | 0.10 | 5.7 | 813 | 4.4 | 2.14 | 0.85 | 1.29 |
| dodecylamine | 0.20 | 4.1 | 1095 | 2.3 | 1.22 | 0.54 | 0.67 |
| tetradecylamine | 0.20 | 4.9 | 1043 | 2.8 | 1.22 | 0.64 | 0.58 |
| hexadecylamine | 0.20 | 4.7 | 934 | 3.3 | 1.20 | 0.69 | 0.51 |
| octadecylamine | 0.20 | 6.0 | 1157 | 3.8 | 1.47 | 0.99 | 0.48 |
| dodecylamine | 0.30 | 4.6 | 1467 | 2.0 | 1.94 | 0.73 | 1.21 |
| tetradecylamine | 0.30 | 4.3 | 1163 | 2.6 | 0.95 | 0.60 | 0.35 |
| hexadecylamine | 0.30 | 4.2 | 1202 | 2.9 | 0.79 | 0.75 | 0.04 |
| octadecylamine | 0.30 | 4.4 | 1191 | 3.3 | 0.97 | 0.87 | 0.10 |
| dodecylamine | 0.40 | 4.4 | 1077 | 1.9 | 1.02 | 0.51 | 0.51 |
| tetradecylamine | 0.40 | 4.3 | 1198 | 2.4 | 0.68 | 0.59 | 0.09 |
| hexadecylamine | 0.40 | 4.3 | 1257 | 2.7 | 0.76 | 0.70 | 0.06 |
| octadecylamine | 0.40 | 4.3 | 1319 | 3.0 | 0.89 | 0.84 | 0.05 |
| dodecylamine | 0.50 | 4.9 | 695 | — | 0.34 | 0.32 | 0.03 |
| tetradecylamine | 0.50 | 4.8 | 913 | 2.2 | 0.50 | 0.45 | 0.05 |
| hexadecylamine | 0.50 | 4.6 | 855 | 2.4 | 0.54 | 0.44 | 0.10 |
| octadecylamine | 0.50 | 4.3 | 1225 | 2.8 | 0.71 | 0.69 | 0.02 |

[a] Each mesostructure was assembled from x MPTS and (I − x) TEOS mixtures in 90:10 (v/v) H$_2$O: ethanol at 65° C.
[b]–[f] These footnotes are the same as those given in Table 5.

Although the framework pore size of a MP-functionalized silica decreases with increasing MP loading, the pore size obtained at a specific MP loading increases with increasing chain length of the surfactant, as expected. As can be seen from the results presented in Table 6, octadecylamine affords pore diameters that are 1.0–1.5 nm larger than those obtained from dodecylamine at MP loadings of x=0.10–0.40. Even at x=0.5, octadecylamine affords a mesoporous MP-HMS with a pore diameter of 2.8 nm.

It is noteworthy that the textural porosity ($V_{tx}$) of MP-functionalized silicas, which arises from the sponge-like nature of the particles (Zhang, W., et al., Chem. Mater, 9 2491 (1997)) decreases rapidly with increasing MP loading. Substituting just 10% of the framework silicon centers with mercaptopropylsilyl groups reduces the pores size from 7.5 nm (x=0) to 4.4 nm (x 0.10), while the textural porosity is increased dramatically from 0.33 to 1.29 cc/g. As the MP functionalization is increased, however, the size of the sponge-like textural pores decreases, as indicated by the broadening of the hysteresis loop. At x values above 0.30, the sponge-like textural porosity is lost.

Table 7 reports the framework crosslinking parameters $Q^4/Q^3$ and $(Q^4+T^3)/Q^3+T^2)$ for representative MP-HMS mesostructures. Note that the framework crosslinking increases with the assembly temperature, as well as with the degree of MP functionalization. Approximately half of the silicon sites are fully cross-linked in a 10%-functionalized MP-functionalized mesostructure assembled at 25° C. In contrast, ~90% of the framework silicon centers are fully crosslinked in a MP-functionalized assembled at 65° C. and a MP loadings of 40–50%. The degree of framework crosslinking could be increased an additional 5–10% by a post synthesis treatment of the as-made mesostructures at 100° C. for 24–72 h.

TABLE 7

$^{29}$Si MAS NMR Crosslinking Parameters for MP-
Functionalized Mesostructures Assembled from Alkyl Amine
Surfactants and x MPTMS and (1 − x) TEOS Mixtures

| Amine Surfactant | x | Assembly Temp. °C. | $Q^4/Q^3$ | $(Q^4 + T^3)/(Q^3 + T^2)$ |
|---|---|---|---|---|
| $C_{12}H_{25}NH_2$ | 0.10 | 25 | 1.20 | 1.15 |
|  | 0.30 | 65 | 3.24 | 5.13 |
| $C_{16}H_{29}NH_2$ | 0.10 | 45 | 1.41 | 1.56 |
|  | 0.40 | 45 | 2.26 | 4.16 |
| $C_{18}H_{37}NH_2$ | 0.10 | 65 | 2.42 | 2.66 |
|  | 0.30 | 65 | 3.77 | 5.59 |
|  | 0.40 | 65 | 4.92 | 8.25 |
|  | 0.50 | 65 | 5.56 | 10.32 |

Previous efforts to prepare MP-functionalized mesostructures by direct assembly methods have been typically limited to compositions in which fewer than 20% of the framework silicon centers are actually functionalized. Stein (Lim, M. H., et al., Chem. Mater. 10 467 (1998)) claimed to have achieved 28.5% MP functionalization for the direct assembly of MP-MCM-41, but in this case the hexagonal structure was microporous. Mesoporous MP-MCM-41 derivatives, however, were limited to about 20% framework functionalization, depending on the relative hydrolysis rates of the organosilane and siloxane precursors (Lim, M. H., et al., Chem. Mater. 10 467 (1998); and Fowler, C. E., et al., Chem. Commun. 1769 (1997)). Limited levels of MP-functionalization (10–20%) also have been reported for hexagonal SBA-15 mesostructures assembled under acidic assembly conditions using a non-ionic surfactant as the structure director (Margolese, D., et al., Chem. Mater. 12 2448 (2000)). Similar low levels of MP-functionalization have been reported for silicas with wormhole framework structures, whether formed from alkylamines (Brown, J., et al., Chem. Commun. 69 (1999); Van Rhijin, W. M., et al., Chem. Commun. 317 (1998); Macquarrie, D. J, et al., Stud. Surf. Sci. Catal. (2000); and Mercier, L., et al., Chem. Mater. 12 188 (2000)) or assembled from non-ionic surfactants (Brown, J., et al., Microporous and Mesoporous Mater. 37 41 (2000); and Richer, R., et al., Chem. Commun. 1775 (1998)). Although organo-silica compositions have been reported in which up to 50% of the silicon sites have been MP-functionalized, these materials lack framework mesoporosity, as judged by both XRD and nitrogen adsorption (Macquarrie, D. J., et al., Stud. Surf. Sci. Catal. (2000)).

The S°I° assembly processes described in the present Example afforded well-expressed wormhole mesostructures in which at least 50% of the framework silicon sites could be MP-functionalized with retention of the pore size, pore volume, and surface area with values as high as 2.8 nm, 0.69 cm$^3$/g and 1225 m$^2$/g, respectively. Depending on the choice of amine surfactant mesostructures with at a 60% MP-loading the products functionalization may or may not exhibit well-expressed XRD peaks and framework pore size distributions. Nevertheless, 60% MP-functionalized mesostructures assembled from octadecylamine exhibited the same pore volume and surface area values (2.6 nm, 0.68 cm$^3$/g and 1133 m$^2$/g, respectively) as the 50% material although the pore distribution extended into the microporous range (~1.0–2.5 nm). Thus, although the degree of wormhole framework ordered decreases above ~60% MP-functionalization and results in the broadening and eventual loss of a pore—pore correlation peak in the XRD, some accessible porosity and surface area is retained even for these highly disordered compositions.

The key to the preparation of these highly functionalized derivatives lies in the use of long-chain alkylamine surfactants as structure directors (e.g., octadecylamine) in combination with a relatively high assembly temperature (e.g. 65° C.). Also, it is important to use a water-miscible organic solvent of high polarity, e.g., 90:10 (v/v) $H_2O$: ethanol. Low polarity solvents, e.g., 63:37 (v/v) $H_2O$: ethanol, were only marginally useful in forming mesostructures at low MP loading (x=0.10) and completely ineffective in generating an organo-functional mesostructure at x values above ~0.20. Apparently, a high polarity solvent favors the partitioning of the organosilane precursor at the surfactant-micelle interface.

Earlier studies of MP-HMS synthesis utilized relatively short chain alkylamines (e.g., dodecylamine) and lower assembly temperatures. The larger amines used in the present Example expand the pore size to allow for the accommodation of more MP groups on the framework walls. The higher assembly temperature provides a better balance of the hydrolysis and condensation reactions of the siloxane precursors for mesostructure formation, as well as to the enhancement of the framework pore size. The increase in framework pore size with increasing assembly temperature is attributable to a reduced level of hydration at the amine-silica interface, which lowers the surfactant packing parameter and, consequently, the curvature of the micelle. Too high an assembly temperature, i.e. greater than 100° C., however, is detrimental to mesostructure formation through S°I° assembly pathways. S°I° assembly relies on H bond formation between the amine surfactant (S°) and siloxane precursors (I°) at the micelle interface. If the thermal energy is too large, the H bonding is compromised, and little or no mesostructure is formed.

Another advantage of a higher S°I° assembly temperature is the improvement realized in the degree of framework crosslinking. As indicated by the crosslinking parameters in Table 7, 70% of the silicon centers for the mesostructures assembled at 65° C. are fully crosslinked at x=0.10. The number of completely crosslinked centers increases to ~90% at x=0.40–0.50. To our knowledge this is the highest level of framework crosslinking achieved for an organo-functional silica mesostructure. The relationship between framework crosslinking and the extent of framework functionalization is attributable to a decrease in the hydration of the S°–I° micelle interface as the number of organo groups increases at this interface. The enhanced framework crosslinking leads to substantial improvements in hydrothermal stability, which can be important for applications involving metal ion trapping in hot water. For instance, MP-functionalized mesostructures at MP loadings of 40–50% are stable to boiling water for at least 10 h, whereas purely inorganic mesostructured silicas degrade substantially under these conditions. Trapping of $Hg^{2+}$ by highly MP-functionalized mesostructures is possible.

The improved hydrothermal stability for MP-functionalized mesostructures should also be important in converting the immobilized mercapto groups to sulfonic acid moieties. Previously reported studies indicate that substantial framework degradation occurs upon the nitric acid (Lim, M. H., et al., Chem. Mater. 10 467 (1998)) oxidation of MP-MCM-41. In contrast, our studies indicate that the peroxide oxidation of mercapto groups in MP-HMS at 50% functionalization (x=0.50) can be achieved with complete retention of the mesostructure. The retention of mesoporosity, together with a high sulfonic acid loading, will prove to be advantageous in liquid catalytic applications, such as monoglyceride synthesis, where facile access to active sites is important in determining product selectivity (Bossaert, W. D., et al., *J. Catal.* 182 156 (1999)). The S°I° assembly processes described in Example 8 have provided unprecedented mercaptopropyl loading of up to 5.6 mmole/g, equivalent to multi-molar homogeneous solutions.

Organo-substituted wormhole structures have been shown to be especially active catalysts in comparison to two dimensional hexagonal mesostructures for a variety of "green" organic transformations, including the Baeyer-Villiger oxidation of ketones, (Lambert, A., et al., *Synlett.* 1052 (2000)) Michael additions, (Mdoe, J. E. G., et al., *Synlett.* 625 (1998)), among several others (Macquarrie, D. J. *Green Chem.* 1 195 (1999); and Clark, J. H., et al., *Chem. Commun.* 853 (1998)). Even greater catalytic reactivity can be anticipated for these wormhole structures by increasing the organo-functional group loading to the levels achieved in the present work.

EXAMPLE 9

This example demonstrates the use of the compositions in Example 4 as precursors to silica mesostructures in which the walls are imprinted by micropores, formed by removing the organo R and L groups through thermal decomposition at temperatures above 500° C. $[O_3Si-R-SiO_3]_{0.5(1-x)}$ $[LSiO_{1.5}]_x$ compositions with R being a $-CH_2CH_2-$ group, L being a cyanoethyl group, and x=0.30 and 0.50, were calcined in air at 600° C. for 4 hours to form imprinted silicas. Nitrogen isotherms in the form of t-plots indicated the presence of substantial microporosity, namely, at least 0.05 cc/g for the silica obtained from the composition with x=0.30 and about 0.25 cc/g for the silica derived from the composition with x=0.50. Also both silicas exhibited an X-ray diffraction line corresponding to a lattice spacing of about 4.1 nm.

It is intended that the foregoing description be only illustrative of the present invention and that the present invention be limited only by the hereinafter appended claims.

We claim:

1. A mesostructured, microporous to mesoporous organo-functional silica composition wherein a framework for the composition is comprised of $O_3Si-R-SiO_3$ and $LSiO_3$ units linked through bridging Si—O—Si bonds, wherein between 1% and 85% of the silicon atoms in the framework are $LSiO_3$ units; wherein L is an organofunctional group linked to one silicon through a silicon-carbon covalent bond and R is an organic group linked to two silicon centers through two silicon-carbon covalent bonds; and wherein the composition exhibits at least one x-ray diffraction line corresponding to a lattice spacing between about 1.8 and 10 nm.

2. The composition in claim 1 prepared through the direct assembly reaction of $Y_3Si-R-SiY_3$ and $LSiY_3$ reagents in the presence of a non-ionic amine surfactant as a structure directing agent for the framework and water as a hydrolyzing agent, wherein the Y is a hydrolyzable alkoxy group, L is the organofunctional group and R is the organic group.

3. The composition of claims 1 or 2 which have an anhydrous and dehydroxylated formula $(O_{1.5}Si-R-SiO_{1.5})_{0.5(1-x)}(LSiO_{1.5})_x$ wherein x has a value between 0.01 and about 0.85, L is the organofunctional group, and R is the organic group.

4. The compositions of any one of claims 1, 2 or 3 wherein the organofunctional group L is comprised of carbon-hydrogen covalent bonds.

5. The compositions of any one of claims 1, 2 and 3 wherein the organofunctional group L is comprised of bonds between carbon and heteroatoms selected from the group consisting of oxygen, nitrogen, sulfur, phosphorous, boron, fluorine, chlorine, bromine, iodine, antimony, arsenic, tin and lead.

6. The compositions of claims 1, 2 and 3 wherein the organic group R is selected from the group consisting of alkylene, phenylene, ferrocenylene, thiophenylene, acetylene, and vinyl groups.

* * * * *

UNITED STATES PATENT AND TRADEMARK OFFICE
CERTIFICATE OF CORRECTION

PATENT NO. : 6,713,643 B2
DATED : March 30, 2004
INVENTOR(S) : Thomas J. Pinnavaia and Yutaka Mori It is certified that error appears in the above-identified patent and that said Letters Patent is hereby corrected as shown below:

Column 1,
Line 50, "Theses" should be -- These --.

Column 2,
Line 47, "SO$_4$" should be -- SiO$_4$ --.

Column 7,
Line 5, "x<0.70" should be -- x≤0.70 --.
Line 7, "sowing" should be -- showing --.
Line 46, "through" should be -- though --.

Column 8,
Line 19, "nitrites" should be -- nitriles --.
Line 49, "though" should be -- through --.

Column 14,
Line 51, "pror" should be -- prior --.

Column 18,
Line 20, "(SiO$_2$)1-x(L'SiO$_{1.5}$)$_x$" should be -- (SiO$_2$)$_{1-x}$(L'SiO$_{1.5}$)$_x$ --.

Column 19,
Line 12, "The coating were crosslinked by heating in an over at" should be -- The coatings were crosslinked by heating in an oven at --.

Column 21,
Line 28, "(SO)" should be -- (S°) --.
Line 37, "The funtionalized" should be -- The functionalized --.

Column 22,
Line 49, "x 0.50," should be -- x = 0.50 --.

Column 24,
Line 46, "4.4nm (x 0.10)" should be -- 4.4nm (x = 0.10) --
Line 65, "additional 5-10%" should be -- additional ~ 5-10% --.

UNITED STATES PATENT AND TRADEMARK OFFICE
CERTIFICATE OF CORRECTION

PATENT NO. : 6,713,643 B2
DATED : March 30, 2004
INVENTOR(S) : Thomas J. Pinnavaia and Yutaka Mori It is certified that error appears in the above-identified patent and that said Letters Patent is hereby corrected as shown below:

Column 27,
Line 4, "up to 5.6" should be -- up to ~ 5.6 --.

Signed and Sealed this

Twentieth Day of July, 2004

JON W. DUDAS
*Acting Director of the United States Patent and Trademark Office*